(12) United States Patent
Tanaka

(10) Patent No.: US 10,719,146 B2
(45) Date of Patent: Jul. 21, 2020

(54) INPUT DEVICE WITH PLURALITY OF TOUCH PADS FOR VEHICLES

(71) Applicant: Sony Corporation, Tokyo (JP)

(72) Inventor: Takehiko Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 13/967,648

(22) Filed: Aug. 15, 2013

(65) Prior Publication Data

US 2014/0062872 A1 Mar. 6, 2014

(30) Foreign Application Priority Data

Aug. 31, 2012 (JP) .................................. 2012-192570

(51) Int. Cl.
*G06F 3/0354* (2013.01)
*G06F 3/01* (2006.01)

(52) U.S. Cl.
CPC .......... *G06F 3/03547* (2013.01); *G06F 3/016* (2013.01); *G06F 2203/014* (2013.01)

(58) Field of Classification Search
CPC ..... B60K 35/00; G06F 3/016; G06F 3/03547; G06F 2203/014
USPC .......................... 345/156–157, 173–174, 184
See application file for complete search history.

(56) References Cited

U.S. PATENT DOCUMENTS

| 5,977,867 | A | * | 11/1999 | Blouin | ..................... | G06F 3/041 178/18.01 |
| 7,450,961 | B1 | * | 11/2008 | Heubel | ................ | G01C 21/365 379/420.01 |
| 7,924,145 | B2 | * | 4/2011 | Yuk | ..................... | G06F 3/03547 340/407.1 |
| 2002/0033795 | A1 | * | 3/2002 | Shahoian | .............. | G06F 1/1616 345/156 |
| 2003/0234764 | A1 | * | 12/2003 | Noguchi | ................. | B60R 11/02 345/156 |
| 2004/0107043 | A1 | * | 6/2004 | de Silva | ............... | G01C 21/367 701/455 |
| 2005/0167252 | A1 | | 8/2005 | Inoue et al. | | |
| 2006/0230340 | A1 | * | 10/2006 | Parsons | ............. | G06F 17/30011 715/201 |
| 2008/0001931 | A1 | * | 1/2008 | Szczerba | ................ | B60K 37/06 345/184 |
| 2008/0150905 | A1 | * | 6/2008 | Grivna | .................... | G06F 3/016 345/173 |
| 2008/0238729 | A1 | * | 10/2008 | Kamii | ................... | G06F 3/0202 341/26 |

(Continued)

FOREIGN PATENT DOCUMENTS

| JP | 2004-325082 A | 11/2004 |
| JP | 2004-345549 A | 12/2004 |
| JP | 4415689 B2 | 2/2010 |

*Primary Examiner* — Amare Mengistu
*Assistant Examiner* — Gloryvid Figueroa-Gibson
(74) *Attorney, Agent, or Firm* — Chip Law Group

(57) ABSTRACT

There is provided an input device, including a steering pad that is arranged on a steering wheel of a vehicle and includes a first face and a second face opposite to the first face, a first input unit that is arranged on the first face of the steering pad and receives an operation causing a first change of a display form in a display unit, and a second input unit that is arranged on the second face of the steering pad and receives an operation causing a second change of a display form in the display unit.

13 Claims, 19 Drawing Sheets

(56) References Cited

U.S. PATENT DOCUMENTS

| | | | |
|---|---|---|---|
| 2008/0318618 A1* | 12/2008 | Park | H04M 1/7258 455/550.1 |
| 2009/0128507 A1* | 5/2009 | Hoshino | G06F 3/016 345/173 |
| 2010/0042950 A1* | 2/2010 | Hsieh | G06F 3/0488 715/835 |
| 2011/0030502 A1* | 2/2011 | Lathrop | B60K 37/06 74/552 |
| 2011/0107261 A1* | 5/2011 | Lin | G06F 3/0482 715/811 |
| 2011/0109575 A1* | 5/2011 | Lii | G06F 3/0481 345/173 |
| 2011/0175803 A1* | 7/2011 | Serafin | B60K 37/06 345/156 |
| 2011/0267291 A1* | 11/2011 | Choi | G06F 3/0346 345/173 |
| 2014/0292668 A1* | 10/2014 | Fricklas | G06F 3/041 345/173 |

* cited by examiner

FIG. 4
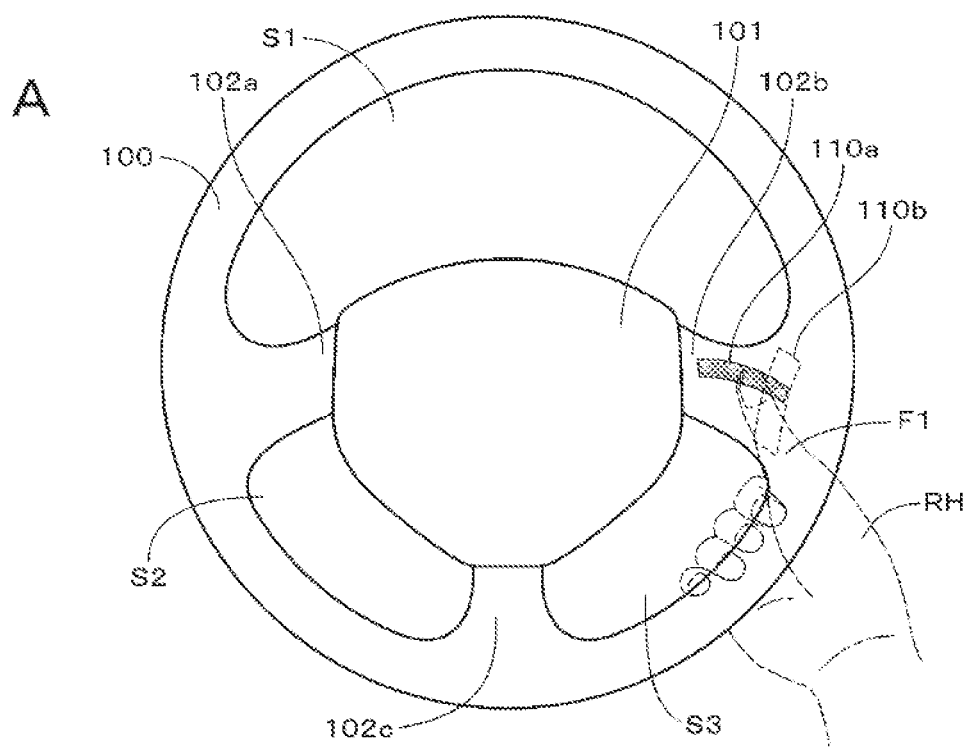
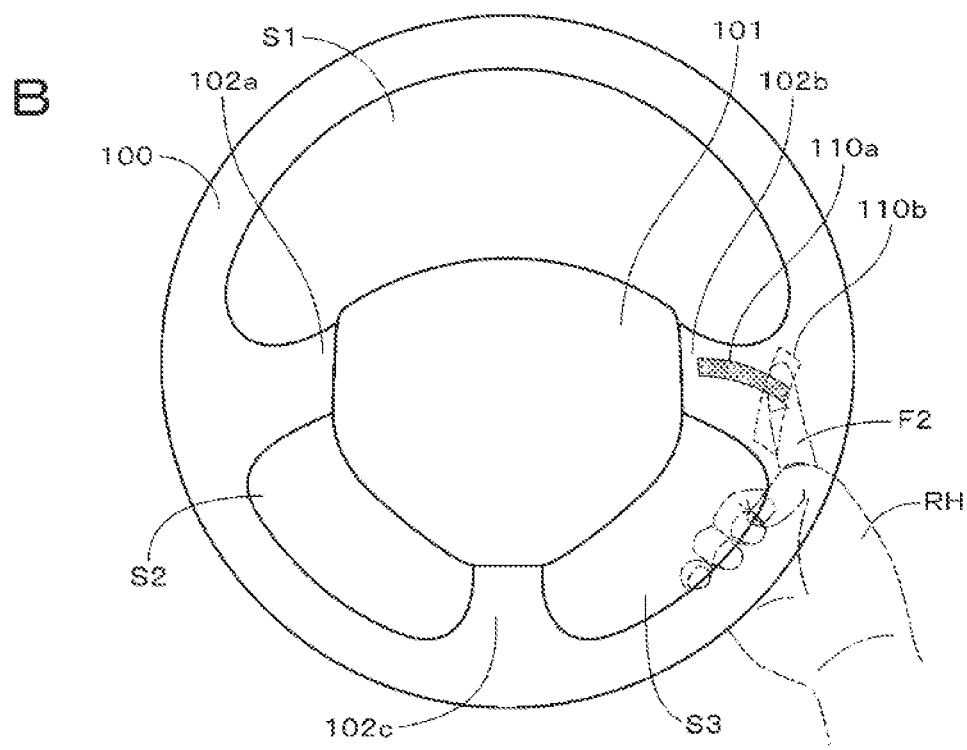

FIG. 10
A
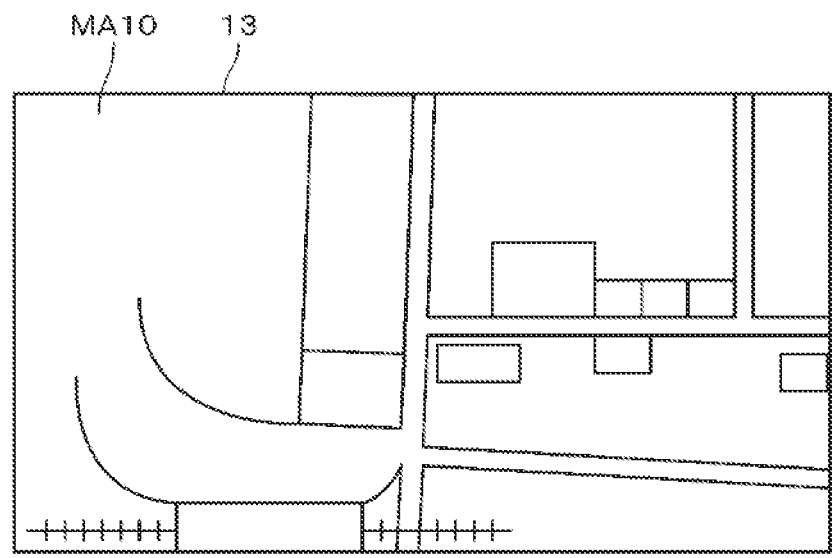
B
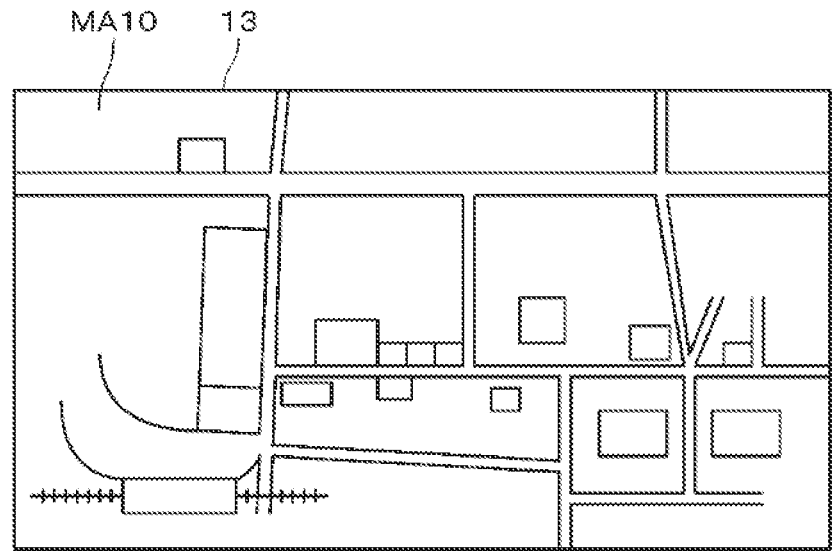

FIG. 11
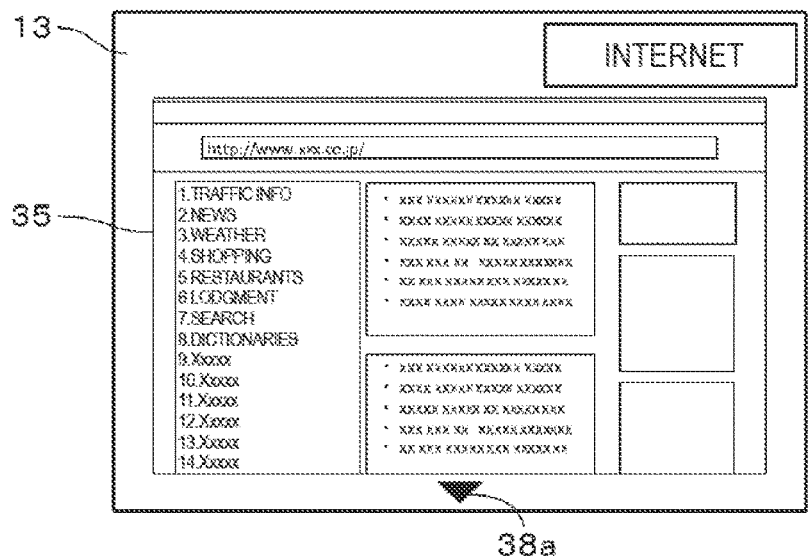
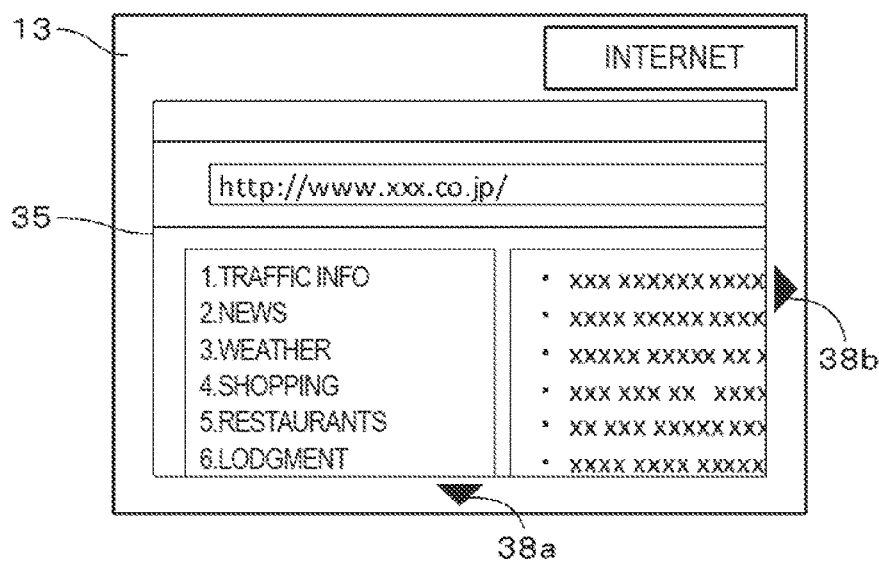
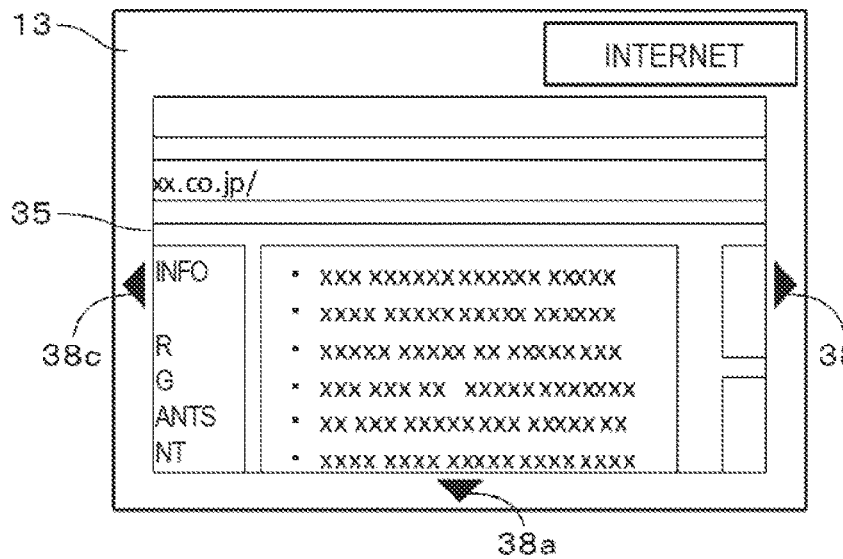

FIG. 19
A
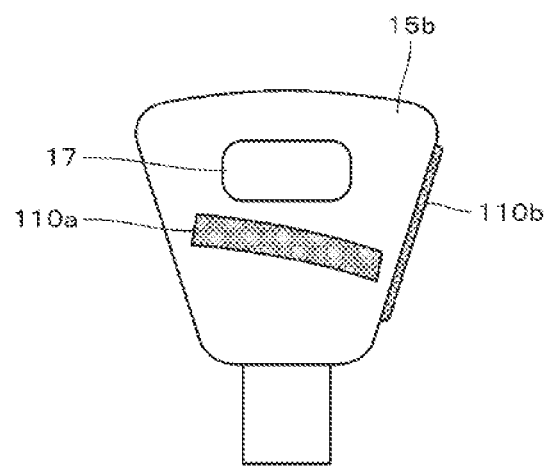
B
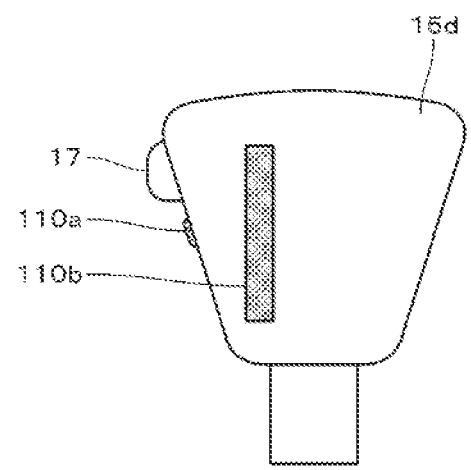

INPUT DEVICE WITH PLURALITY OF TOUCH PADS FOR VEHICLES

BACKGROUND

The present technology relates to an input device.

Techniques of enabling drivers to perform an operation for executing various functions (for example, an audio playback function and a car navigation function) of vehicles without moving their line of sight have been proposed. An operation performed by a driver without moving his/her line of sight is referred to as a blind operation or the like. JP 2004-345549 A discloses a pointing device for performing a blind operation. According to the technique disclosed in JP 2004-345549 A, a driver touches a single pointing device with his/her finger and moves his/her finger up or down, and then a cursor displayed on a display unit moves up or down.

SUMMARY

In recent years, the size of a display unit in a vehicle has tended to increase, as has the number of icons displayed on the display unit. There are cases in which a plurality of icons are extensively displayed on the display unit. However, in the technique disclosed in JP 2004-345549 A, the cursor can be moved only up or down using the single pointing device. For this reason, there is a problem in that it is difficult to move the cursor for selecting an icon in an appropriate direction.

It is desirable to provide an input device capable of performing an appropriate operation on a display.

According to an embodiment of the present technology, there is provided an input device including a steering pad that is arranged on a steering wheel of a vehicle and includes a first face and a second face opposite to the first face, a first input unit that is arranged on the first face of the steering pad and receives an operation causing a first change of a display form in a display unit, and a second input unit that is arranged on the second face of the steering pad and receives an operation causing a second change of a display form in the display unit.

According to the embodiments of the present technology described above, an appropriate operation can be performed on a display.

BRIEF DESCRIPTION OF THE DRAWINGS

FIG. 4A is a diagram for describing an exemplary operation on a first input unit, and FIG. 4B is a diagram for describing an exemplary operation on a second input unit;

FIG. 10A is a diagram for describing enlargement of a display according to a press and hold operation on a first input unit, and FIG. 10B is a diagram for describing reduction of a display according to a press and hold operation on a second input unit;

FIG. 11A illustrates an example of a web page, FIG. 11B is a diagram for describing enlargement of a display according to a press and hold operation on a first input unit, and FIG. 11C is a diagram for describing transition of a display according to a press and slide operation on a first input unit;

FIG. 19 is a diagram for describing a modified example.

DETAILED DESCRIPTION OF THE EMBODIMENT(S)

Figure 1:
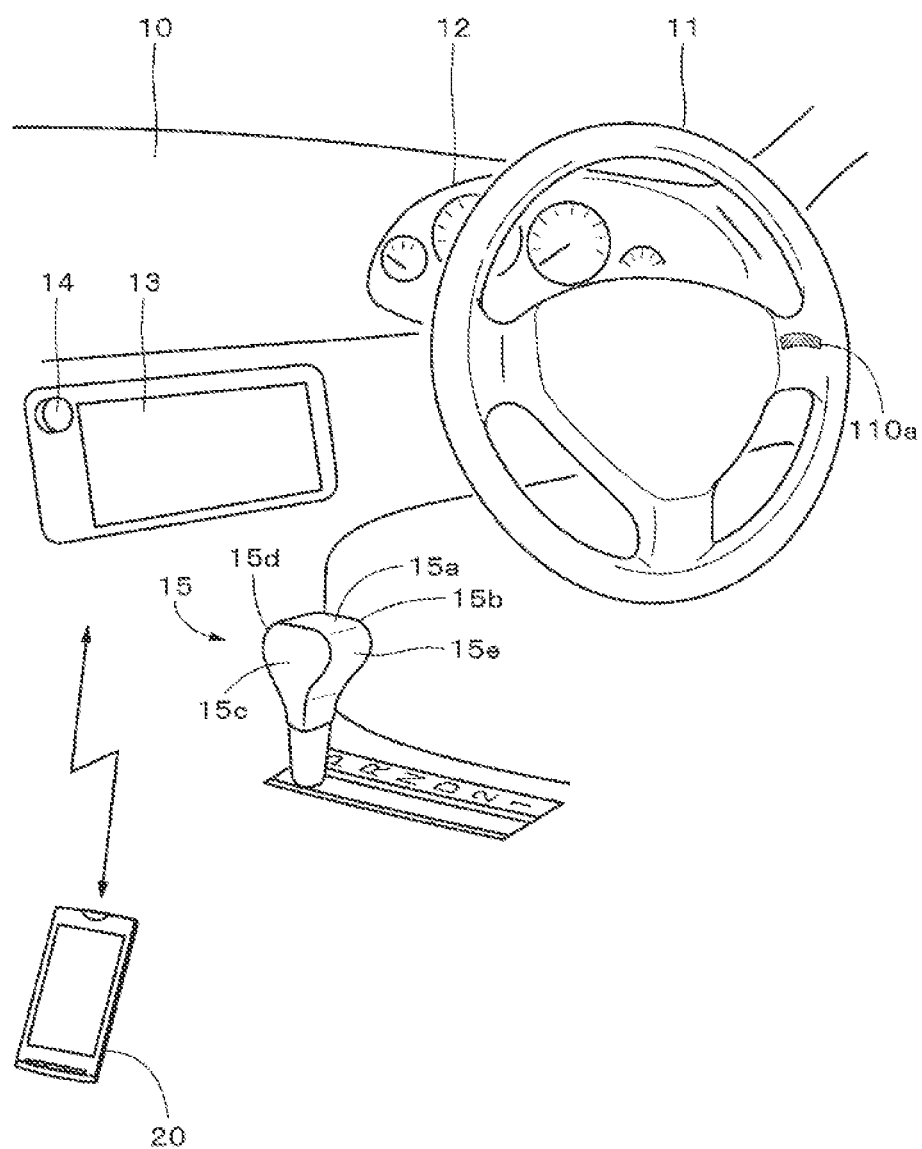
FIG. 1 is a diagram for describing an exemplary interior of a vehicle.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, exemplary embodiments of the present technology will be described with reference to the accompanying drawings. The description will proceed in the following order.

<1. First embodiment>
<2. Second embodiment>
<3. Modified examples>

The following embodiments are exemplary concrete examples of the present technology, and a subject matter of the present technology is not limited to the following embodiments.

1. First Embodiment

"Exemplary Interior of Vehicle"

For example, an input device of an embodiment of the present technology can be applied to a steering wheel of a vehicle. FIG. 1 illustrates an exemplary interior of a vehicle. A dashboard (which is referred to as a "dash panel," an "instrument panel," or the like) 10 is disposed below a windshield inside the vehicle. In front of a driver seat, a steering wheel 11 is mounted on the dashboard 10, and gauges are arranged. Examples of the gauges 12 include a speedometer, a tachometer, and a fuel gauge. The details of the steering wheel 11 will be described later, but a first input unit 110a is arranged on, for example, a spoke section of the steering wheel 11.

A display unit 13 is arranged on approximately the center of the dashboard 10. For example, the display unit 13 includes a display panel such as a liquid crystal display (LCD) panel or an organic electroluminescence (EL) panel. For example, a menu screen, a screen used to adjust an air conditioner, a screen used to perform an operation related to audio playback, and a map based on a navigation function are displayed on the display unit 13.

An operating unit 14 is arranged around the display unit 13. The operating unit 14 is a generic unit which may be a button or a switch arranged on the dashboard or the like. The display unit 13 may be configured with a touch screen, and the display unit 13 may function as an operating unit.

A shift lever 15 that is movable in a forward direction and a backward direction (appropriately referred to collectively as a "moving direction") of the vehicle is arranged between the driver seat and the front passenger seat. The shift lever 15 includes a top face 15a, a right side face 15b, and a left side face 15c which extend in the moving direction of the vehicle. The shift lever 15 further includes two faces which are approximately orthogonal to the moving direction of the vehicle. A face at the dashboard side is referred to as a front face 15d, and the other face is referred to as a rear face 15e. The shift lever 15 may be a so-called column shift lever arranged near the steering wheel 11.

An in-car device performing various kinds of control is received inside the dashboard 10. The in-car device is electrically connected with the steering wheel 11. For example, the in-car device executes display control on the display unit 13 or processing according to an operation performed on the operating unit 14, the first input unit 110a, and a second input unit which will be described later. A configuration of the in-car device will be described later.

The in-car device may perform communication with a mobile terminal 20 of the driver. As communication is performed between the in-car device and the mobile terminal 20, transmission and reception of data included in each device are performed. For example, as display data is transmitted from the mobile terminal 20 to the in-car device, a menu screen of the mobile terminal 20 may be displayed on the display unit 13. Further, for example, as operation information is transmitted from the in-car device to the mobile terminal 20, a function of the mobile terminal 20 according to an operation performed on the in-car device may be executed.

Although not shown, for example, a turn signal switch lever or a light switch is arranged near the steering wheel 11. Components different from the components illustrated in FIG. 1 may be added, or some of the illustrated components may be omitted. Further, the position at which each component is arranged or the shape of each component can be appropriately changed.

"Configuration of Steering Wheel"

Next, an exemplary configuration of a steering wheel will be described. In the following description, expressions specifying, for example, left, right, up, and down directions are used, but the directions are based on a direction in the drawings. An expression specifying a direction is for convenience of description, and the present technology is not limited to the corresponding direction.

Figure 2:
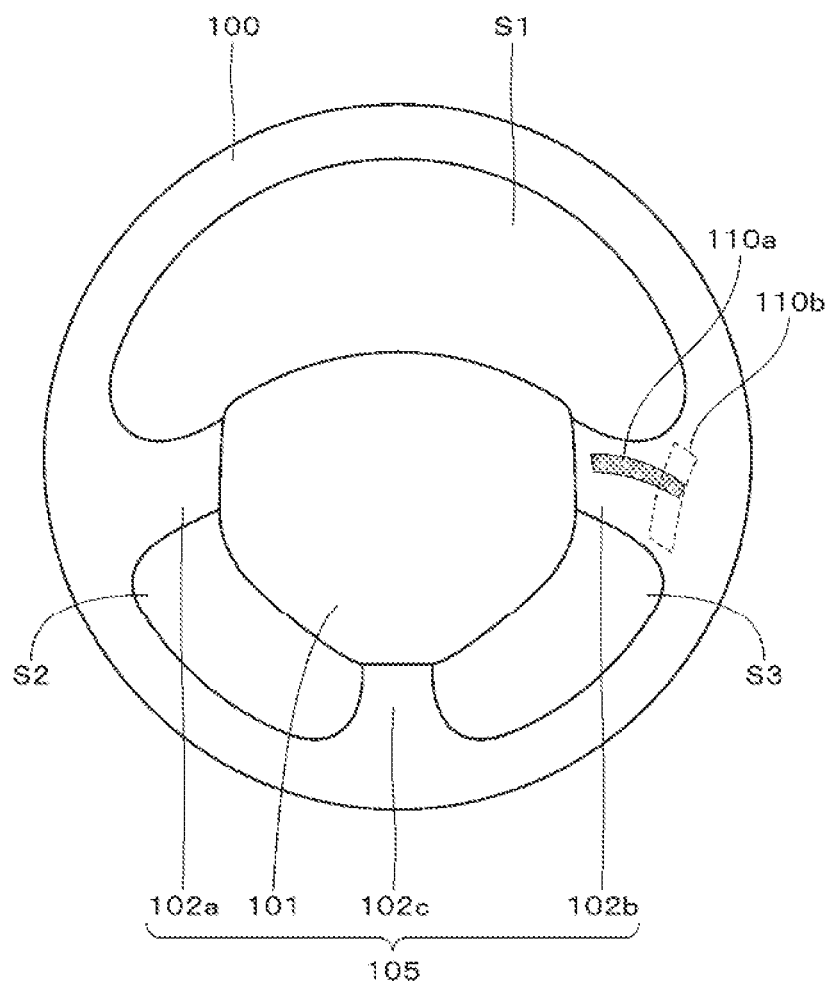
FIG. 2 is a diagram illustrating an exemplary configuration of the surface of a steering wheel.

FIG. 2 is a front view of the steering wheel 11. The steering wheel 11 includes a wheel section 100 of an approximate ring shape. For example, a center pad 101 of an approximate pentagonal shape is arranged in a space in the wheel section 100. For example, an airbag is received inside the center pad 101.

A spoke section 102a and a spoke section 102b are arranged to the left and right of the center pad 101, and a spoke section 102c is arranged below the center pad 101. When it is unnecessary to distinguish the respective spoke sections from one another, the spoke sections are appropriately referred to as a spoke section 102.

The wheel section 100 and the center pad 101 are connected with each other through the spoke section 102a, the spoke section 102b and the spoke section 102c. In other words, the steering wheel 11 is one in which the wheel section 100, the center pad 101, and the spoke section 102 are integrally configured.

For example, a steering pad 105 is configured with the center pad 101 and the spoke section 102. As the steering pad 105 is preferably arranged inside the wheel section 100, a name thereof is inconsequential.

Space between the wheel section 100 and the center pad 101 is partitioned by the spoke section 102a and the spoke section 102b to form a space S1 of an approximate semi-circular shape. Space between the wheel section 100 and the center pad 101 is partitioned by the spoke section 102a and the spoke section 102c to form a space S2. Space between the wheel section 100 and the center pad 101 is partitioned by the spoke section 102b and the spoke section 102c to form a space S3.

In the steering pad 105, the first input unit 110a is arranged on, for example, a first face of the spoke section 102b. For example, the first face of the spoke section 102b is a face approximately facing the driver who sits on the driver seat.

For example, the first input unit 110a is configured with a pressure-sensitive touch pad. For example, the first input unit 110a has the shape of a band extending in the horizontal direction (left-right direction), and all or part thereof is curved. For example, the first input unit 110a is curved in an arch form or a cantilever form. The entire form of the first input unit 110a may be a straight line form. In FIG. 2, the first input unit 110a is represented by hatching.

In the steering pad 105, for example, a second input unit 110b is arranged on a second face of the spoke section 102b. For example, the second face of the spoke section 102b is a face at the back side (opposite side) of the first face.

For example, the second input unit 110b is configured with a pressure-sensitive touch pad. For example, the second input unit 110b has a shape of a band extending in the vertical direction (up-down direction), and all or part thereof is curved. For example, the second input unit 110b is curved in an arch form or a cantilever form. The entire form of the second input unit 110b may be a straight line form. Since the second input unit 110b is not seen from the front side, in FIG. 2, the second input unit 110b is represented by a dotted line.

Figure 3:
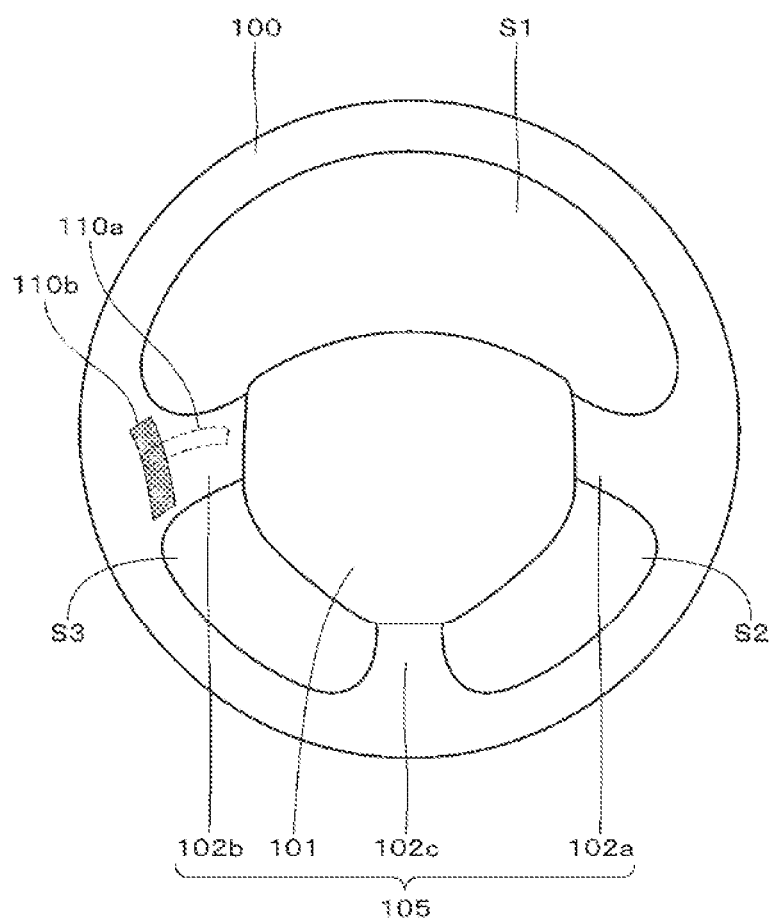
FIG. 3 is a diagram illustrating an exemplary configuration of the back surface at the side opposite to the surface of a steering wheel.

FIG. 3 is a back view of the steering wheel 11. The second input unit 110b is arranged on the second face of the spoke section 102b of the steering pad 105. In FIG. 3, the second input unit 110b is represented by hatching, and the first input unit 110a is represented by a dotted line. For example, the first input unit 110a and the second input unit 110b are arranged at positions at which projection images thereof are approximately orthogonal to each other. In the following description, when it is unnecessary to distinguish the first input unit 110a and the second input unit 110b from each other, they are appropriately referred to as an input unit 110.

The shape of the steering wheel or the steering pad can be appropriately changed. A non-illustrated component may be added. For example, a horn button may be arranged on the spoke section. Further, a hard switch such as a "decision button" or a "return button" may be arranged on the spoke section. For example, the "decision button" is a button used to confirm selection of an icon displayed on the display unit. The "return button" is a button used to return a screen of the display unit to an immediately previous screen.

The input unit 110 is preferably arranged in a range in which the input unit 110 is operable by different fingers (for example, a thumb and an index finger) when a predetermined portion of the wheel section 100 is gripped. Although the position at which the wheel section 100 is gripped slightly differs according to a driver, this difference is not significant. Further, since personal differences in the length of the driver's finger are not usually significant, the range in which the input unit 110 is arranged can be appropriately set.

"Operation on First Input Unit and Second Input Unit"

Exemplary operations on the first input unit 110a and the second input unit 110b will be described. For example, operations on the first input unit 110a and the second input unit 110b are performed using the driver's right hand while driving (including a temporary stop by a signal or the like).

FIG. 4A illustrates an exemplary operation on the first input unit 110a. A predetermined portion of the wheel section 100 is gripped by the driver's right hand RH. For example, four fingers excluding a thumb F1 of the right hand RH pass through the space S3 and grip the predetermined portion of the wheel section 100. Then, the tip of the thumb F1 (appropriately referred to as a "thumb") comes in contact with an operation face of the first input unit 110a, and an operation using the thumb F1 is performed on the operation face of the first input unit 110a.

For example, the first input unit 110a receives the following operation.

(1) An operation (hereinafter referred to as a "slide operation") of causing the thumb F1 to come in contact with a predetermined portion of the first input unit 110a and moving the thumb F1 in the left direction or the right direction while the thumb F1 is in contact with the position.

(2) An operation (hereinafter referred to as a "press operation") of pressing (pressurizing) the first input unit 110a. For example, the first input unit 110a is pressed for about one second. Further, a configuration in which the press operation can be detected at any portion of the first input unit 110a is provided. Therefore, the driver can perform the press operation by pressing an arbitrary portion of the first input unit 110a. In the following description, an operation by pressing force of a threshold value or more is referred to as "pressing," and an operation by pressing force smaller than a threshold value is referred to as "contact."

(3) An operation (hereinafter referred to as a "press and slide operation") of continuously performing the press operation and the slide operation on the first input unit 110a. When pressing is first performed in the press operation, it is unnecessary to maintain pressing force of the press operation in the slide operation.

(4) An operation (hereinafter referred to as a "press and hold operation") of continuously performing the press operation on the first input unit 110a for a predetermined period of time or more. For example, the predetermined period of time is set to about 2 seconds.

When the thumb F1 is moved in the horizontal direction in the state in which the wheel section 100 is gripped, it is difficult to move the thumb F1 in a straight line form. However, in the present technology, as an example, all or part of the first input unit 110a is curved, and the first input unit 110a is arranged in the direction in which the thumb F1 can be easily moved. Thus, operability is improved when the slide operation or the press and slide operation is performed on the first input unit 110a.

Further, since the first input unit 110a has a band shape having a given width, for example, even when the overall length of the thumb F1 differs according to a driver, it is possible to reliably come in contact with the first input unit 110a.

FIG. 4B illustrates an exemplary operation on the second input unit 110b. A predetermined portion of the wheel section 100 is gripped with the driver's right hand RH. For example, the predetermined portion of the wheel section 100 is gripped with the four fingers excluding the index finger F2. Then, the tip of the index finger F2 (appropriately referred to as an "index finger") comes in contact with the surface of the second input unit 110b, and an operation using the index finger F2 is performed on the surface of the first input unit 110a.

The second input unit 110b receives an operation similar to the operation on the first input unit 110a.

(1) An operation (hereinafter referred to as a "slide operation") of causing the index finger F2 to come in contact with a predetermined portion of the second input unit 110b and moving the index finger F2 in the upward direction or in the downward direction while causing the index finger F2 to come in contact with the position.

(2) An operation (hereinafter referred to as a "press operation") of pressing the second input unit 110b. For example, the second input unit 110b is pressed for about one second. Further, a configuration in which the press operation can be detected at any portion of the second input unit 110b is provided. Therefore, the driver can perform the press operation by pressing an arbitrary portion of the second input unit 110b.

(3) An operation (hereinafter referred to as a "press and slide operation") of continuously performing the press operation and the slide operation on the second input unit 110b. When pressing is first performed in the press operation, it is unnecessary to maintain pressing force of the press operation in the slide operation.

(4) An operation (hereinafter referred to as a "press and hold operation") of continuously performing the press operation on the second input unit 110b for a predetermined period of time or more. For example, the predetermined period of time is set to about 2 seconds.

When the index finger F2 is moved in the vertical direction in the state in which the wheel section 100 is gripped, it is difficult to move the index finger F2 in a straight line form. However, in the present technology, as an example, all or part of the second input unit 110b is curved, and the second input unit 110b is arranged in the direction in which the second input unit 110b can be easily moved. Thus, operability is improved when the slide operation or the press and slide operation is performed on the second input unit 110b.

Further, since the second input unit 110b has a band shape having a given width, for example, even when the overall length of the index finger F2 differs according to a driver, it is possible to reliably come in contact with the second input unit 110b. Further, an operation on the second input unit 110b is not limited to the index finger and may be performed using the middle finger.

Figure 5:
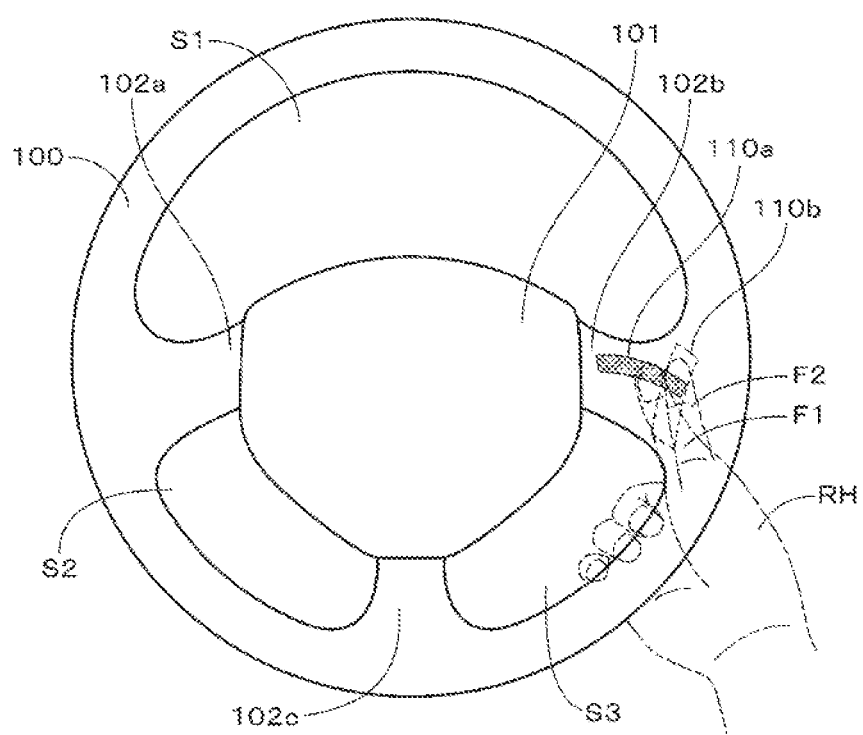
FIG. 5 is a diagram for describing an exemplary operation on each of a first input unit and a second input unit.

As illustrated in FIG. 5, for example, the operations on the first input unit 110a and the second input unit 110b may be continuously performed by the thumb F1 and the index finger F2. For example, the slide operation is performed on the first input unit 110a using the thumb F1, and then the slide operation may be continuously performed on the second input unit 110b using the index finger F2. In this case, since the wheel section 100 is gripped with the three fingers and the palm, the operability of the steering wheel 11 does not deteriorate. Further, since the driver can operate the input unit 110 while gripping the wheel section 100, it is unnecessary to move a line of sight when an operation is performed.

A positional relation between the first face on which the first input unit 110a is arranged and the second face on which the second input unit 110b is arranged is not limited to a relation of the front and back. Preferably, the first face and the second face are opposite to each other. The orientation is not limited to a relation in which the faces turn toward each other. Preferably, the two faces have regions operable by different fingers (for example, the thumb and the index finger) in a given state and are arranged adjacent to each other. The second face may be approximately orthogonal to the first face like the side face of the steering pad 105.

Further, an informing (feedback) operation may be performed for the driver according to the operation on the input unit 110. For example, the informing operation is performed for the driver through a sound or a display. However, since the finger comes in contact with the input unit 110 when an operation is performed, preferably, the informing operation is performed such that the input unit 110 vibrates. As the informing operation is performed, the driver can recognize a change in a display in the display unit without looking at the display unit.

In FIGS. 4 and 5, the left hand is not illustrated, but in practice, a predetermined portion of the wheel section 100, for example, the position approximately symmetrical to the position gripped by the right hand RH in the wheel section 100, is gripped by the left hand. Further, for example, in FIG. 4, a mounting portion of a steering shaft is not illustrated, and a part of the steering wheel 11 is not illustrated.

"Configuration of In-Car Device"

Figure 6:
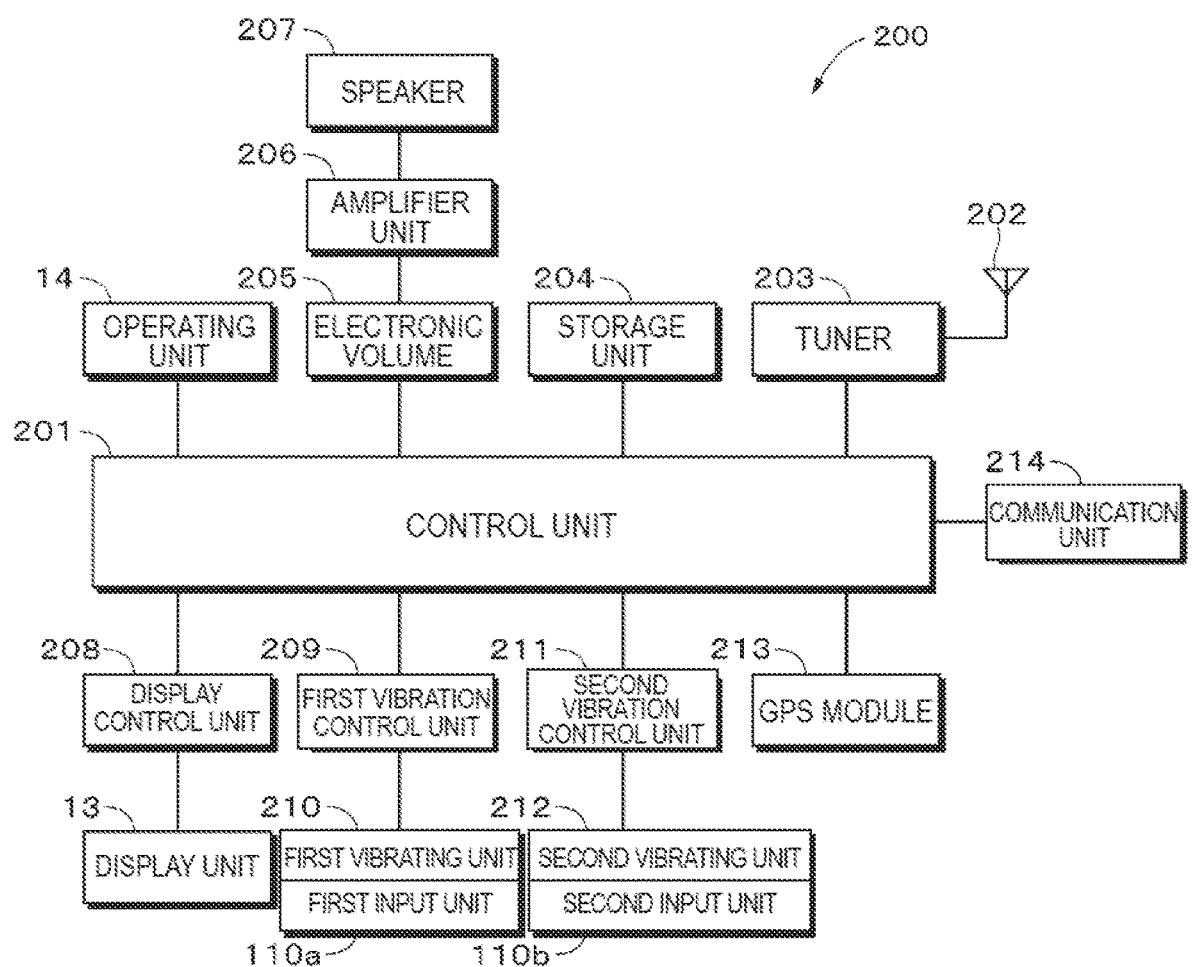
FIG. 6 is a block diagram illustrating an exemplary configuration of an in-car device according to a first embodiment.

FIG. 6 illustrates an exemplary configuration of the in-car device. For example, an in-car device 200 includes a control unit 201, an antenna 202, a tuner 203, a storage unit 204, an electronic volume 205, an amplifier unit 206, a speaker 207, the operating unit 14, a display control unit 208, the display unit 13, a first vibration control unit 209, a first vibrating unit 210, the first input unit 110a, a second vibration control unit 211, a second vibrating unit 212, the second input unit 110b, a Global Positioning System (GPS) module 213, and a communication unit 214.

The control unit 201 is configured with a central processing unit (CPU), a random access memory (RAM) and a read only memory (ROM) which are connected to the CPU, and the like. For example, the ROM stores a program which is read and executed by the CPU. The RAM is used as a work memory of the CPU. The CPU executes various kinds of processes according to a program stored in the ROM, and controls the components of the in-car device 200 in general.

The antenna 202 is an antenna for receiving a radio wave of television broadcasting or radio broadcasting, and is connected to the tuner 203. The tuner 203 performs processing such as demodulation or analog/digital conversion of a broadcasting signal received by the antenna 202, and decoding of encoded data to restore video data or audio data. Video data is transferred to the display control unit 208 through the control unit 201. Then, a video of television broadcasting is displayed on the display unit 13 according to control of the display control unit 208. Audio data is transferred to the electronic volume 205 through the control unit 201, then transferred to the speaker 207 through the amplifier unit 206, and then output as a sound through the speaker 207.

The storage unit 204 is at least one of a memory device built in the in-car device 200 and a memory device removably mounted to the in-car device 200, and includes a driver performing recording and playback processes on the memory devices. Examples of the storage unit 204 include a hard disk, a flash memory, an optical disc, and a magneto optical disc. For example, the storage unit 204 stores audio data or map data.

For example, the playback process is performed on the audio data stored in the storage unit 204, and then the audio data which has been subjected to the playback process is transferred to the control unit 201. According to control of the control unit 201, the audio data is transferred to the speaker 207 through the electronic volume 205 and the amplifier unit 206, and the audio data is played back through the speaker 207.

The electronic volume 205 amplifies the audio data supplied from the tuner 203 or the storage unit 204 and adjusts a volume based on control of the control unit 201. The audio data with the adjusted volume is supplied to the amplifier unit 206. The amplifier unit 206 amplifies the audio data supplied from the electronic volume 205 with a predetermined amplification factor, and supplies the amplified audio data to the speaker 207. The speaker 207 outputs the audio data supplied from the amplifier unit 206 to the outside as a sound.

The operating unit 14 allows the user to perform various kinds of input operations on the in-car device 200. For example, the operating unit 14 is configured with a button, a touch screen, a switch, and the like. The operating unit 14 may be configured with a touch screen integrally configured with the display unit 13. When the user performs an input operation on the operating unit 14, a control signal is generated in response to the input operation, and then the control signal is output to the control unit 201. Then, arithmetic processing or control according to the control signal is performed through the control unit 201. A device that remotely operates the in-car device 200 such as a remote controller may be included in the operating unit 14.

The display control unit 208 controls display content of the display unit 13 according to control of the control unit 201. For example, the display control unit 208 performs control of causing a screen displayed on the display unit 13 to transition or control of moving a cursor displayed on the display unit 13 in a predetermined direction according to an operation on the input unit 110.

Further, the display control unit 208 performs a process of causing a map to be displayed on the display unit 13 based on map data and mapping the current position of a vehicle on the map when a navigation system is activated. For example, the map data or/and information representing the current position of a vehicle are supplied from the control unit 201 to the display control unit 208. Further, the display control unit 208 performs a process of enlarging/reducing the displayed map or a process of appropriately updating display content of the map according to the moving direction of a vehicle. Further, the function of the display control unit 208 may be incorporated into the control unit 201.

The display unit 13 is configured with an LCD or an organic EL as described above. The display unit 13 performs a display based on control of the display control unit 208.

The first vibration control unit 209 controls vibration of the first vibrating unit 210 according to control of the control unit 201. For example, the first vibration control unit 209 applies a voltage of a predetermined pattern to the first vibrating unit 210 according to control of the control unit 201.

The first vibrating unit 210 is configured integrally with the first input unit 110a and includes, for example, a piezoelectric element. The first vibrating unit 210 may be configured with a motor or the like. The first vibrating unit 210 vibrates according to a voltage of a predetermined pattern applied by the first vibration control unit 209. As the first vibrating unit 210 vibrates, the first input unit 110a vibrates.

The second vibration control unit 211 controls vibration of the second vibrating unit 212 according to control of the control unit 201. For example, the second vibration control unit 211 applies a voltage of a predetermined pattern to the second vibrating unit 212 according to control of the control unit 201.

The second vibrating unit 212 is configured integrally with the second input unit 110b, and includes, for example, a piezoelectric element. The second vibrating unit 212 may be configured with a motor or the like. The second vibrating unit 212 vibrates according to a voltage of a predetermined pattern applied by the second vibration control unit 211. As the second vibrating unit 212 vibrates, the second input unit 110b vibrates. The first vibration control unit 209 and the second vibration control unit 211 may have the same configuration.

The input unit 110 has the above-described shape. When an operation is performed on the input unit 110, an operation signal is generated in response to the operation, and the generated operation signal is supplied to the control unit 201.

For example, the GPS module 213 includes a GPS antenna and a GPS receiver through which a radio wave is received from a satellite, a gyroscope sensor, a vehicle speed sensor, and the like. Based on the radio wave received through the GPS antenna or the like, data or sensor information obtained by various kinds of sensors is supplied to the control unit 201.

The control unit 201 estimates the current position of the vehicle based on the radio wave from the satellite. Further, the control unit 201 determines a direction (moving direction) in which the vehicle moves based on information obtained by the gyroscope sensor, and determines the distance (moving distance) the vehicle moves based on information obtained by the vehicle speed sensor. The current position of the vehicle is accurately determined using the determination results. The control unit 201 reads map data corresponding to the current position of the vehicle, and supplies the read map data and information representing the current position of the vehicle to the display control unit 208. The map data or the like is displayed on the display unit 13 according to control of the display control unit 208.

For example, the communication unit 214 is a generic unit having a configuration for performing communication with the outside. For example, a telephone call or Internet communication can be performed through the communication unit 214. A telephone can be configured as a so-called hands-free phone without a telephone set.

Further, the control unit 201 may be configured to control a non-illustrated component. For example, the control unit 201 may perform control of turning on or off or adjusting the level of the air conditioner of the vehicle.

An exemplary operation of the in-car device 200 will be described. Further, the in-car device 200 can perform a known operation in addition the above-described operation.

An exemplary operation which is performed in response to an operation on the input unit 110 will be described. When an operation on the input unit 110 is performed, the input unit 110 generates an operation signal. The operation signal is supplied from the input unit 110 to the control unit 201.

For example, the control unit 201 detects the touch position of the input unit 110, pressing force applied when touched, and a period of time while touched based on the supplied operation signal, and determines content of the operation. The detection process may be performed in the input unit 110, and notification representing the detection process result may be given to the control unit 201.

The control unit 201 generates a display control signal for changing display content of the display unit 13 according to content of the determined operation. The display control signal is supplied from the control unit 201 to the display control unit 208. As the display control unit 208 operates according to the display control signal, the display content displayed on the display unit 13 changes.

Further, when an operation on the input unit 110 is performed, the informing operation is performed for the driver. An example of the informing operation will be described.

For example, the slide operation is performed on the first input unit 110a. An operation signal according to the slide operation is supplied from the first input unit 110a to the control unit 201. The control unit 201 determines that the operation performed on the first input unit 110a is the slide operation based on the operation signal supplied from the first input unit 110a. The control unit 201 generates a vibration control signal for vibrating the first vibrating unit 210, and supplies the vibration control signal to the first vibration control unit 209.

The first vibration control unit 209 generates a voltage of a predetermined pattern according to the vibration control signal supplied from the control unit 201, and supplies the voltage to the first vibrating unit 210. The first vibrating unit 210 vibrates according to the voltage supplied from the first vibration control unit 209. As the first vibrating unit 210 vibrates, the first input unit 110a vibrates. The driver feels the vibration of the first input unit 110a. Even when the slide operation is performed on the second input unit 110b, the informing operation is similarly performed.

"Example of Menu Screen"

Figure 7:
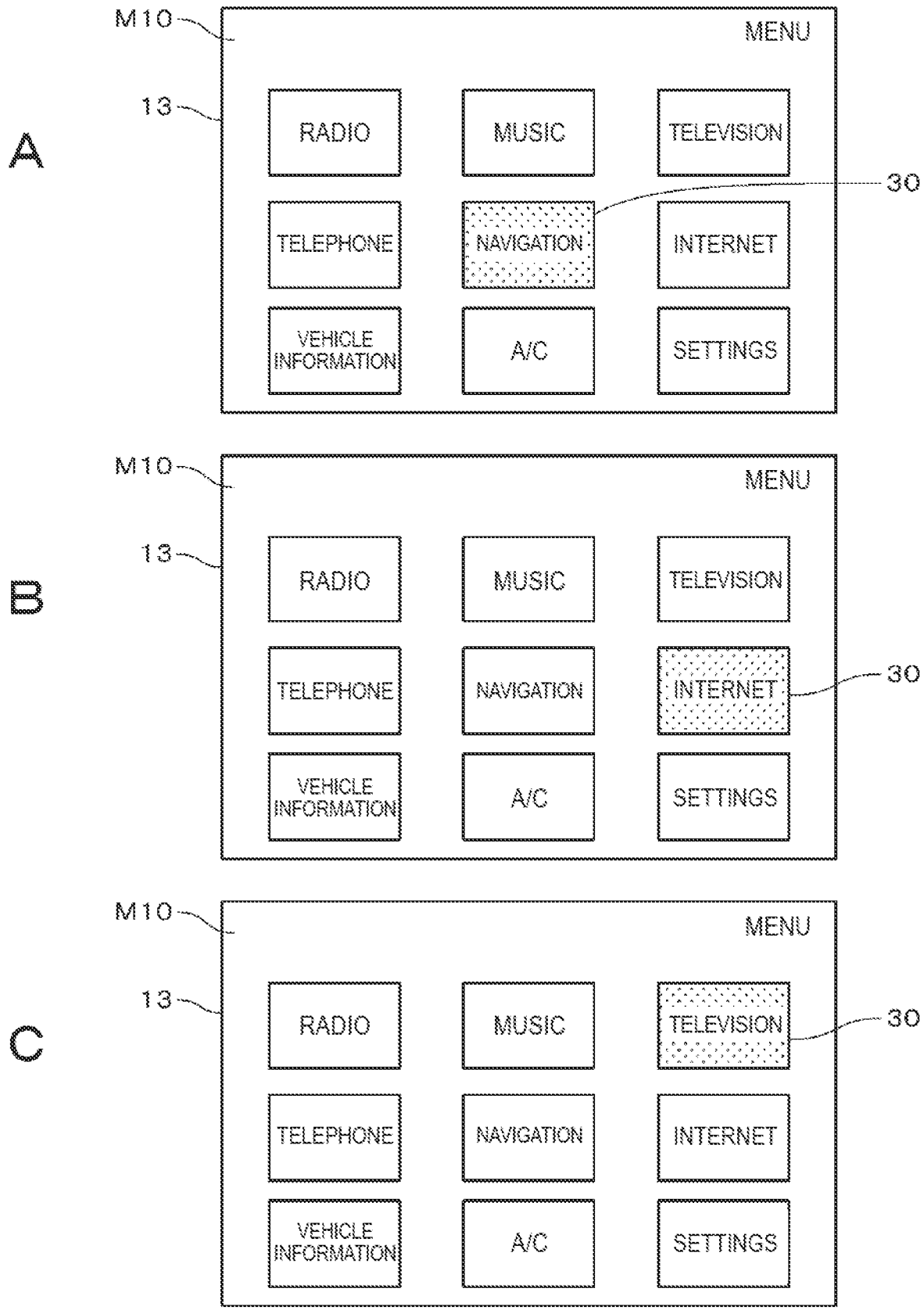
FIG. 7A illustrates an example of a menu screen.
FIG. 7B illustrates an example of movement of a cursor according to a slide operation on a first input unit.
FIG. 7C illustrates an example of movement of a cursor according to a slide operation on a second input unit.

Next, a concrete example of a process according to an operation on the input unit 110 will be described. FIG. 7 illustrates an example of a menu screen displayed on the display unit 13. The menu screen is a screen on which a plurality of items (hereinafter referred to as "icons") corresponding to functions available in the vehicle are displayed. As illustrated in FIG. 7A, "radio," "music," "television," "telephone," "navigation" (an abbreviation for "car navigation"), "Internet," "vehicle information," "A/C" (an abbreviation for "air conditioning"), and "settings" are displayed on the menu screen M10 of the display unit 13 as a plurality of icons. For example, "vehicle information" refers to a remaining amount of a power source (gasoline or a battery), a traveling distance, and the like. For example, "settings" refers to display brightness of the display unit 13, the size of text, and the like.

Each icon may be displayed by a mark other than text or may be displayed in the form in which text and a mark are combined. An icon different from the illustrated icons may be displayed. Further, an arrangement position of each icon may be set. When the user who sits in the driver seat or the front passenger seat selects a desired icon from among a plurality of icons and then performs a decision operation, a function corresponding to the desired icon is executed.

Among the plurality of icons, a cursor is displayed on a selected icon. The cursor is a display for distinguishing the selected icon from the other icons. Examples of the cursor include a line surrounding the selected icon or a so-called highlighting display for displaying the selected icon with different color or brightness from the other icons. When the menu screen is activated, for example, the cursor is displayed on an icon arranged at the center. In the example illustrated in FIG. 7A, a cursor 30 is displayed on the icon "navigation."

"Processing According to Operation"

First, exemplary processing according to the slide operation among the respective operations will be described. Through the slide operation (an example of a first operation) on the first input unit 110a, movement of the cursor in the horizontal direction (an example of a first direction) is performed as an example of a first change. A direction in which the first input unit 110a is arranged corresponds to a moving direction (horizontal axis) of the cursor. Through the slide operation (an example of a second operation) on the second input unit 110b, movement of the cursor in the vertical direction (an example of a second direction) is performed as an example of a second change. The vertical direction refers to a direction (appropriately referred to as an approximately orthogonal direction) orthogonal or approximately orthogonal to the horizontal direction in which the cursor moves according to the slide operation on the first input unit 110a. A direction in which the second input unit 110b is arranged corresponds to a moving direction (vertical axis) of the cursor.

For example, the driver performs the slide operation of bringing his/her thumb F1 into contact with the first input unit 110a and moving the thumb F1 in the right direction. The cursor 30 moves in the direction corresponding to the moving direction of the thumb F1. In other words, as illustrated in FIG. 7B, the cursor 30 moves from the icon "navigation" to the icon "Internet." In this case, the number of times the cursor 30 has moved is once, and the moving distance corresponds to one icon.

Further, the driver performs the slide operation of bringing his/her index finger F2 into contact with the second input unit 110b and moving the index finger F2 in the upward direction. The cursor 30 moves in the direction corresponding to the moving direction of the index finger F2. In other words, as illustrated in FIG. 7C, the cursor 30 moves the icon "Internet" to the icon "television." In this case, the number of times the cursor 30 has moved is once, and the moving distance corresponds to one icon.

The informing operation is performed according to the operation on the input unit 110. For example, as the slide operation is performed, the cursor 30 moves from the icon "navigation" to the icon "Internet" (transition from FIG. 7A to FIG. 7B). In this case, control of vibrating the first vibrating unit 210 for about one second is performed, and the first input unit 110a vibrates once for about one second according to this control. The driver who has felt the vibration can recognize that the cursor 30 has moved one icon without looking at the display unit 13.

For example, in the state illustrated in FIG. 7C, the driver performs the slide operation of bringing his/her thumb F1 into contact with the first input unit 110a and moving the thumb F1 in the left direction twice. The cursor moves from the icon "television" to the icon "radio" according to the two slide operations. In this case, the number of times the cursor 30 has moved is twice, and the moving distance corresponds to two icons.

The first input unit 110a vibrates twice according to the two slide operations. The driver who has felt the vibration can recognize that the cursor 30 has moved two icons without looking at the display unit 13. The second input unit 110b vibrates similarly when an operation is performed on the second input unit 110b. As described above, when the cursor 30 can move, the operated input unit 110 vibrates in a first pattern. For example, the operated input unit 110 vibrates the number of times the cursor 30 has moved for about one second.

For example, the cursor 30 moves to the icon "radio" while passing though the icon "music." The cursor 30 may be displayed on the icon "radio" without passing through the icon "music."

Further, there are cases in which it is difficult to move the cursor 30 in the direction corresponding to the slide operation. In this case, the operated input unit 110 vibrates in a second pattern different from the first pattern.

For example, as illustrated in FIG. 7C, the cursor is considered to be displayed on the icon "television." For example, even when the slide operation of moving the thumb F1 in the right direction is performed on the first input unit 110a, there is no icon corresponding to the operation direction, and it is difficult to move the cursor 30. As described above, when it is difficult to move the cursor 30 in the direction corresponding to the slide operation, control of vibrating the first vibrating unit 210 is performed according to the second pattern. For example, control of vibrating the first vibrating unit 210 three times at short intervals is performed. Control of continuously vibrating the first vibrating unit 210 for about three seconds may be performed.

The vibration of the first vibrating unit 210 is felt by the driver. The driver can recognize that the cursor 30 does not move in the direction corresponding to the slide operation. A similar process is performed when the slide operation of moving the index finger F2 on the second input unit 110b in the upward direction is performed in the state in which the cursor 30 is displayed on the icon "television."

The slide operation may be performed in each direction using a single touch pad. However, for example, even through the driver is informed of movement of the cursor through vibration of the single touch pad, it is difficult for the driver to recognize the moving direction of the cursor only through the vibration of the entire touch pad.

In the present technology, since the first input unit 110a and the second input unit 110b are independently arranged according to the moving direction of the cursor 30, it is possible to inform the driver of the moving direction of the cursor 30. As the first input unit 110a vibrates, the driver can recognize that the cursor 30 moves in the right direction or the left direction. As the second input unit 110b vibrates, the driver can recognize that the cursor 30 moves in the upward direction or the downward direction.

Next, processing according to the press operation which is an example of a third operation will be described. As described above, the press operation is an operation of pressing the input unit 110 by pressing force of a threshold value or more. Of course, the driver has only to perform an operation of pressing the input unit 110, and it is unnecessary for the driver to be aware of the threshold value. A range smaller than the threshold value is set as a dead zone, and thus control is not performed. Thus, when the driver simply touches the input unit 110 with a finger, control is not performed. However, when the finger moves in the left or right direction, it is detected as the slide operation. In order to more reliably detect the press operation, the press operation may be implemented in combination with a hard switch.

When the press operation is performed on the input unit 110, selection of an icon is confirmed, and a function corresponding to the selected icon is executed. For example, when the cursor 30 is displayed on the icon "navigation" as illustrated in FIG. 7A, the press operation is performed on the first input unit 110*a*. The function corresponding to the icon "navigation," that is, the car navigation system is activated according to the press operation. As the car navigation system is activated, for example, the map is displayed on the display unit 13. For example, when the press operation is performed on the first input unit 110*a* in the state in which the cursor 30 is displayed on the icon "Internet" as illustrated in FIG. 7B, the display of the display unit 13 transitions to the Internet screen.

The press operation may be performed on the second input unit 110*b*. The press operation may be performed on the first input unit 110*a* and the second input unit 110*b* at approximately the same time. However, since the first input unit 110*a* is arranged on the face facing the driver and is operated by the thumb, an operation can be easily performed when the press operation is performed on the first input unit 110*a*. For this reason, a configuration in which only the first input unit 110*a* receives the press operation may be provided.

Next, processing according to the press and slide operation will be described. Through the press and slide operation (an example of a fourth operation) on the first input unit 110*a*, movement of a display of the display unit in the horizontal direction (an example of the first direction) is performed as an example of the first change. A direction in which the first input unit 110*a* is arranged corresponds to the moving direction (horizontal axis) of the cursor. Through the press and slide operation (an example of a fifth operation) on the second input unit 110*b*, movement of a display of the display unit in the vertical direction (an example of the second direction) is performed as an example of the second change. The vertical direction refers to a direction (appropriately referred to as an approximately orthogonal direction) approximately orthogonal to the horizontal direction in which a display transitions according to the press and slide operation on the first input unit 110*a*. A direction in which the second input unit 110*b* is arranged corresponds to the direction (horizontal axis) in which a display transitions.

Figure 8:
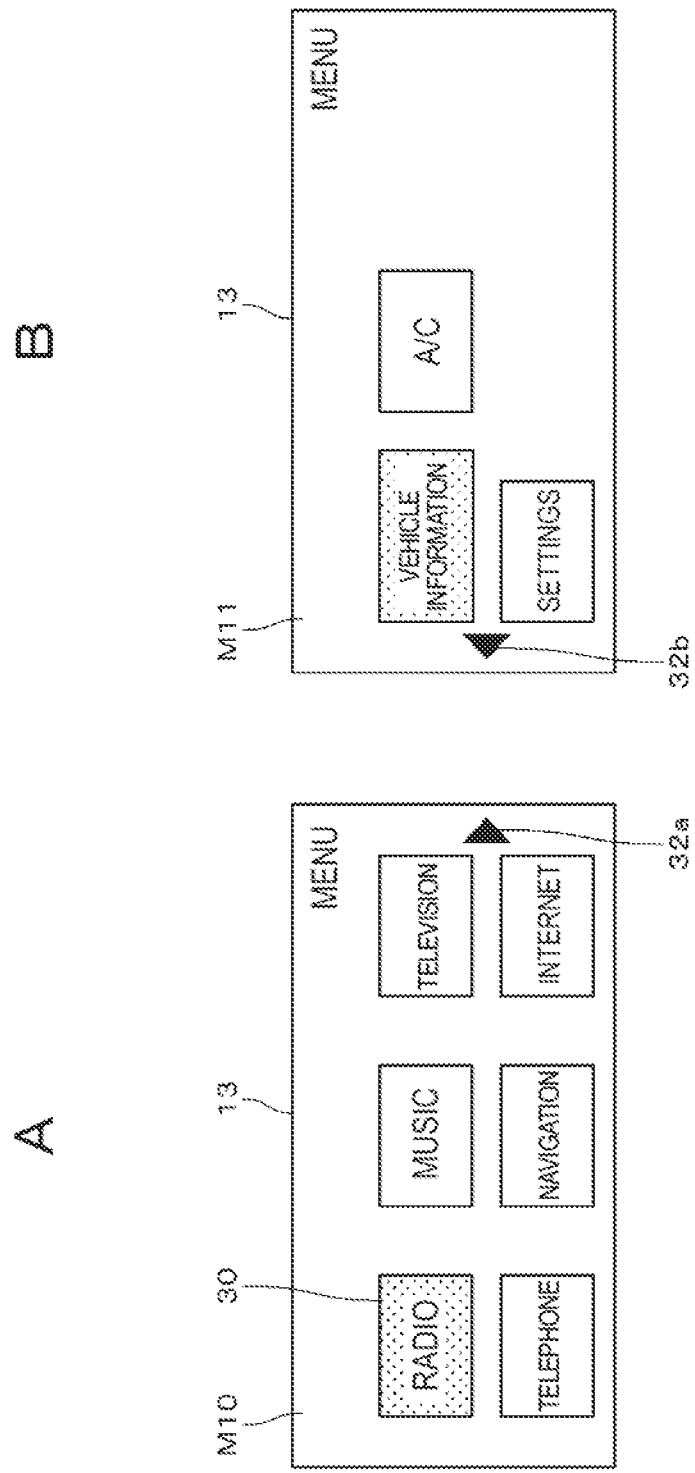
FIGS. 8A and 8B illustrate an example of transition of a screen according to a press and slide operation on a first input unit.

FIG. 8A illustrates an example of the menu screen M10 displayed on the display unit 13. Six icons (the icon "radio," the icon "music," the icon "television," the icon "telephone," the icon "navigation," and the icon "Internet") are displayed on the display unit 13. When the display unit 13 has a limited display region, it is difficult to display all icons. In this case, a display of the display unit 13 is caused to transition, and thus other icons are displayed on the display unit 13. A direction in which a display can transition may be represented by a mark such as an arrow. For example, a mark 32*a* representing the right direction is displayed on the display unit 13 together with the six icons.

The driver performs the press and slide operation on the first input unit 110*a* in the right direction. In response to the press and slide operation in the right direction, the six icons illustrated in FIG. 8A slide in the right direction, another icon slides to enter the display unit 13 from the left side of the display unit 13. Then, display content of the display unit 13 is changed to a menu screen M11 illustrated in FIG. 8B. Three icons (the icon "vehicle information," the icon "A/C," and the icon "settings") are displayed on the display unit 13. As a display changes, a direction (left direction) in which a display can newly transition is represented by a mark 32*b*.

When the driver performs the press and slide operation in the left direction, a display of the display unit 13 transitions from the display illustrated in FIG. 8B to the display illustrated in FIG. 8A. As described above, the display of the menu screen can transition through the press and slide operation.

Further, as the cursor 30 is moved through the slide operation, a process of selecting a predetermined icon and a process of confirming selection of a predetermined icon through the press operation and executing a function corresponding to the selected icon are performed as described above. Further, the menu screen may transition in the downward direction, and the menu screen may be switched according to the press and slide operation on the second input unit 110*b*.

Figure 9:
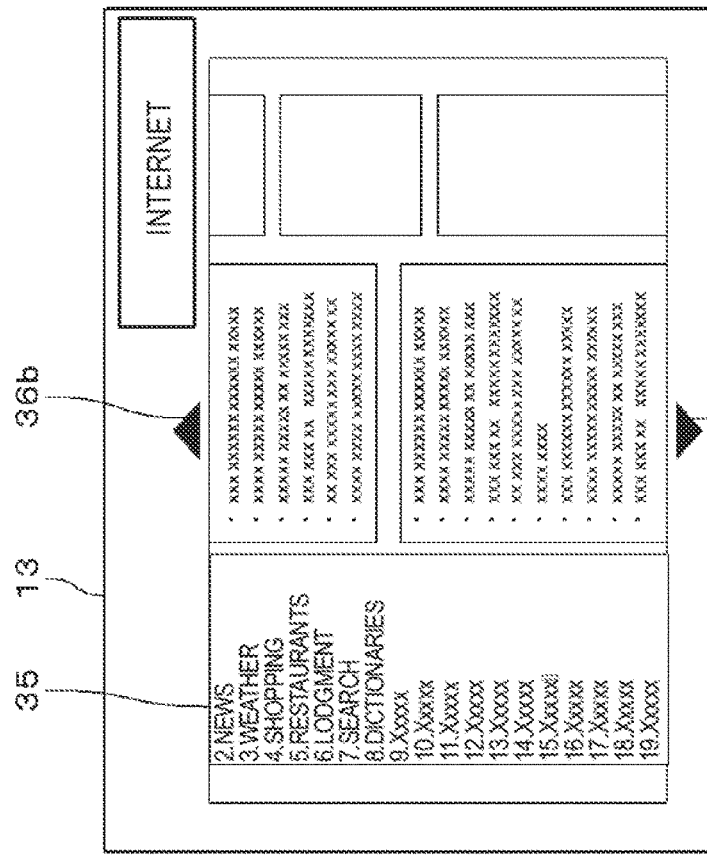
FIG. 9A illustrates an example of a web page.
FIG. 9B illustrates an example of transition of a screen according to a press and slide operation on a second input unit.

Transition of a display by the press and slide operation is not limited to the transition of the menu screen. For example, display content of the display unit 13 may be scrolled according to the press and slide operation. For example, the Internet function is assumed, and a web page 35 is displayed on the display unit 13 as illustrated in FIG. 9A. A direction in which scrolling can be performed is represented by an arrow mark 36*a*.

The driver performs the press and slide operation on the second input unit 110*b* in the downward direction, and thus the web page 35 can be scrolled in the downward direction. FIG. 9B illustrates an example of a display after scrolling. Scrollable directions (the upward direction and the downward direction) are represented by a mark 36*b* and a mark 36*c*. Then, the driver further performs the press and slide operation on the second input unit 110*b* in the upward direction or the downward direction, and thus the web page 35 can be scrolled in the upward direction or the downward direction.

It is undesirable for the driver to browse the web page 35 in terms of safety. However, when the user other than the driver browses the web page 35, the user may not know how to scroll the web page 35. In this case, the driver can perform an operation of scrolling the web page 35 displayed on the display unit 13 without diverting his/her line of sight. The web page 35 is scrolled in response to this operation.

Next, processing according to the press and hold operation will be described. Through the press and hold operation (an example of a sixth operation) on the first input unit 110*a*, a display of the display unit is enlarged as an example of the first change. Through the press and hold operation (an example of a seventh operation) on the second input unit 110*b*, a display of the display unit is reduced as an example of the second change. A display of the display unit 13 may be reduced according to the press and hold operation on the first input unit 110*a*, and a display of the display unit 13 may be enlarged according to the press and hold operation on the second input unit 110*b*.

For example, as illustrated in FIG. 10A, a map MA10 displayed on the display unit 13 is enlarged according to the press and hold operation on the first input unit 110*a*. As illustrated in FIG. 10B, the map MA10 displayed on the display unit 13 is reduced according to the press and hold operation on the second input unit 110*b*.

For example, as illustrated in FIG. 11A, the web page 35 is displayed on the display unit 13, and a direction (downward direction) in which the web page 35 can be scrolled is represented by a mark 38*a*. When the press and hold operation is performed on the first input unit 110*a* in the state in which the web page 35 is displayed, a part of the web page 35 is enlarged and displayed as illustrated in FIG. 11B. A direction (right direction) in which a display can be newly scrolled according to a display update is represented by a mark 38b.

Further, as the press and slide operation is performed on the first input unit 110a in the right direction, the web page 35 can be scrolled in the right direction as illustrated in FIG. 11C. A direction (left direction) in which a display can be newly scrolled according to a display update is represented by a mark 38c.

2. Second Embodiment

"Configuration of In-Car Device"

Figure 12:
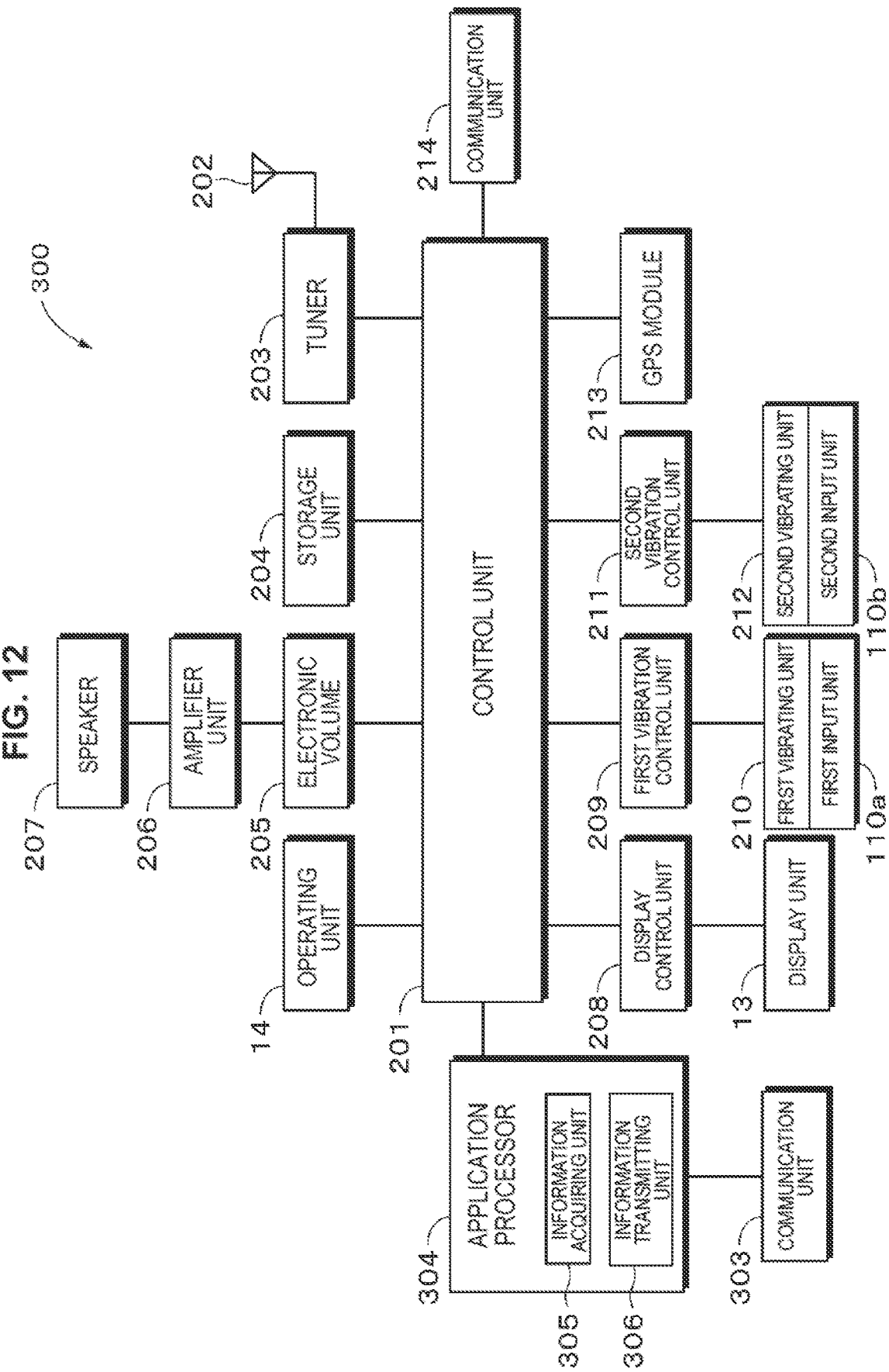
FIG. 12 is a block diagram illustrating an exemplary configuration of an in-car device according to a second embodiment.

FIG. 12 illustrates an exemplary configuration of an in-car device according to a second embodiment. Among components of an in-car device 300, the same components as or components corresponding to the components of the in-car device 200 are denoted by the same reference numerals. The following description will focus on components different from those of the in-car device 200 among the components of the in-car device 300.

The in-car device 300 includes a communication unit 303 and an application processor 304. The communication unit 303 performs communication with the mobile terminal 20. When Bluetooth (a registered trademark) is used as a communication scheme, the communication unit 303 performs, for example, transmission and reception of application information and operation information between the in-car device 300 and the mobile terminal 20 using a serial port profile. Further, when universal serial bus (USB) is used for a connection between the in-car device 300 and the mobile terminal 20, transmission and reception of arbitrary information such as application information and operation information can be performed using iAP. Here, any method may be used as a connection method. Besides Bluetooth and USB, any connection method by which arbitrary data communication can be performed may be employed. The communication unit 303 may have the same configuration as the communication unit 214.

The application processor 304 performs a predetermined process through the in-car device 200 in conjunction with an operation of the mobile terminal 20. The application processor 304 executes a predetermined application and functions as an information acquiring unit 305 and an information transmitting unit 306.

The information acquiring unit 305 acquires application information transmitted from the mobile terminal through the communication unit 303. For example, the information acquiring unit 305 acquires information (appropriately referred to as "menu screen information") related to a configuration of a menu screen transmitted from the mobile terminal 20 through the communication unit 303. The menu screen information is information representing a plurality of icons or an arrangement of icons configuring the menu screen.

The menu screen information acquired by the information acquiring unit 305 is supplied to the display control unit 208 through the control unit 201. The display control unit 208 causes the menu screen to be displayed on the display unit 13 based on the menu screen information supplied from the control unit 201. In other words, the menu screen of the mobile terminal 20 is displayed on the display unit 13 of the in-car device 300. Preferably, a menu screen having the same icon arrangement as the menu screen of the mobile terminal 20 is displayed on the display unit 13. Here, since the display region of the display unit 13 is diverse, the icon arrangement may be appropriately changed according to the size of the display region of the display unit 13.

The information transmitting unit 306 transmits operation information transmitted from the in-car device 300 side to the mobile terminal 20. For example, the menu screen of the mobile terminal 20 is displayed on the display unit 13. Then, the slide operation is performed on the input unit 110 to select a predetermined icon. Further, the press operation is performed on the input unit 110 to confirm icon selection. The information transmitting unit 306 transmits information representing an icon to the mobile terminal 20 as operation information. As will be described later, the mobile terminal 20 executes a function corresponding to an icon included in the operation information. As described above, the mobile terminal 20 can be controlled using the in-car device 300.

"Configuration of Mobile Terminal"

Figure 13:
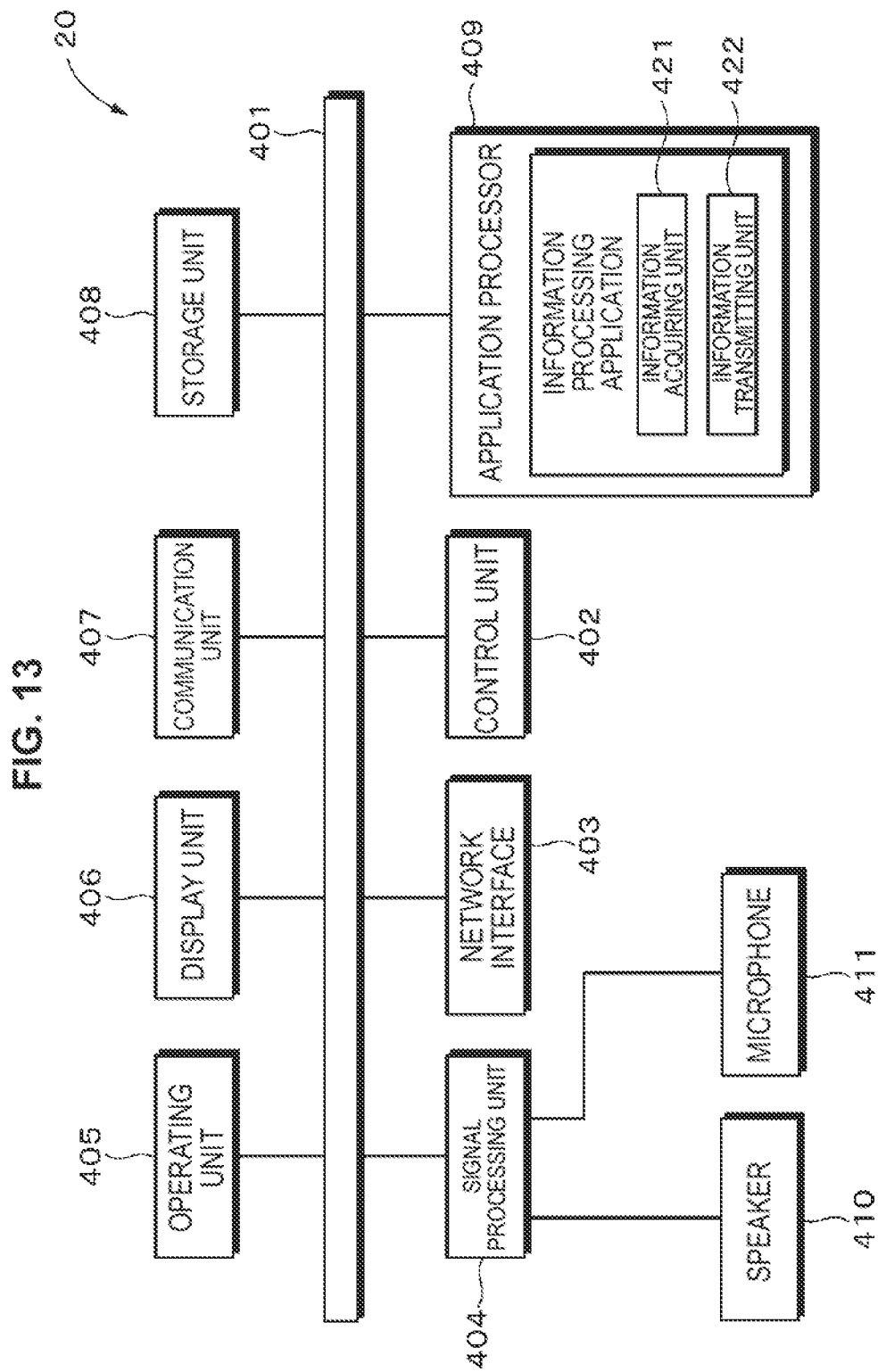
FIG. 13 is a block diagram illustrating an exemplary configuration of a mobile terminal.

FIG. 13 illustrates an exemplary configuration of the mobile terminal 20. The mobile terminal 20 includes a data bus 401, and a control unit 402, a network interface 403, a signal processing unit 404, an operating unit 405, a display unit 406, a communication unit 407, a storage unit 408, and an application processor 409 are connected to the data bus 401.

For example, the control unit 402 is configured with a CPU, a RAM, a ROM, and the like. The ROM stores, for example, a program which is read and executed by the CPU. The RAM is used as a work memory of the CPU. The CPU executes various kinds of processes according to a program stored in the ROM, and controls the components of the mobile terminal 20 in general.

For example, the network interface 403 performs transmission and reception of data with an external base station or the like based on a predetermined protocol. Examples of a communication scheme include a local area network (LAN), wireless fidelity (Wi-Fi) (a registered trademark), and communication using a 3G line. For example, the mobile terminal 20 can access the Internet or perform communication with another person through communication performed by the network interface 403.

The signal processing unit 404 includes a modulator/demodulator, an analog to digital (A/D) converter, a digital to analog (D/A) converter, an audio codec, and the like. The modulator/demodulator of the signal processing unit 404 modulates an audio signal to be transmitted, and demodulates a received signal. A signal to be transmitted is converted into a digital signal through the A/D converter, and a received signal is converted into an analog signal through the D/A converter. A speaker 410 that outputs a sound and a microphone 412 that receives a sound are connected to the signal processing unit 404.

The operating unit 405 is an input device through which the user performs various kinds of inputs to the mobile terminal 20. For example, the operating unit 405 includes a button, a touch screen, a switch, and the like. The operating unit 405 may be configured with a touch screen configured integrally with the display unit 406. When the user performs an input operation on the operating unit 405, a control signal according to the input is generated, and the generated control signal is output to the control unit 402. Then, the control unit 402 performs arithmetic processing or control according to the control signal.

For example, the display unit 406 is a display device configured with an LCD, an organic EL panel, or the like. The display unit 406 displays a menu for various kinds of operations of the mobile terminal 20, and displays a menu screen on which a plurality of icons are arranged, a music list, information (an artist name, a song title, and the like) on music being played, video content, image content, and the like.

The communication unit 407 is a communication module that performs communication with the in-car device 300 through a connection method such as Bluetooth or USB. Examples of a communication method in the communication unit 407 include communication by Bluetooth which is wireless communication and communication by USB which is wired communication. A Bluetooth module that performs Bluetooth communication is a module that can perform transmission and reception of data by near field communication of the Bluetooth scheme. The Bluetooth module exchanges data with the in-car device 300.

The Bluetooth module includes an antenna, a signal processing unit (not shown), and the like. For example, when audio data is transmitted to the in-car device 300 which is an external Bluetooth device, the Bluetooth module executes predetermined signal processing on audio data to be transmitted through the signal processing unit, and then transmits the audio data to the in-car device 300 through the built-in antenna. Further, for example, when audio data is received from the in-car device 300, the Bluetooth module receives the audio data transmitted from the in-car device 300 through the built-in antenna, and then supplies the audio data to the built-in signal processing unit 404. Then, the signal processing unit executes predetermined signal processing on the audio data, and generates an audio signal. Thus, the audio data played back by the mobile terminal 20 can be output from the in-car device 300, and the audio data played back by the in-car device 300 can be output from the mobile terminal 20.

When USB which is wired communication is used as a communication scheme in the communication unit 407, the in-car device 300 is connected with the mobile terminal 20 through a USB cable. Audio data is supplied from the mobile terminal 20 to the in-car device 300 through the USB cable.

Thus, the mobile terminal 20 can be connected with the in-car device 300, music data stored in the mobile terminal 20 can be played back, and a corresponding song can be output from the in-car device 300 as a sound.

Here, any method may be used as a connection method. Besides Bluetooth and USB, any connection method by which arbitrary data communication can be performed may be employed. Further, the communication scheme is appropriately selected based on a type of the mobile terminal 20, a type of an operation system (OS), or the like.

For example, the storage unit 408 is configured with a large-capacity storage medium such as an HDD or a flash memory, and stores, for example, content data such as a song played back by the mobile terminal 20. The music data is stored in the storage unit 408 in the state in which the music data is compressed in a format such as WAV (RIFF waveform Audio Format), MP3 (MPEG Audio Layer-3), or AAC (Advanced Audio Coding). Further, music information on a song including an artist name, an album title, a song title, a total playback time, and playback time information is also held in the storage unit 408 as tag data of music data. The music information may be acquired, for example, using a CDDB (Compact Disc Data Base). Further, the user may set the music information as he/she pleases.

For example, the application processor 409 is configured with a CPU, a ROM, a RAM, and the like, and functions as a processing unit that executes various kinds of applications installed in the mobile terminal 20. For example, there are various kinds of applications such as a music playback application, a video playback application, a map application, a weather forecast application, a game application, an Internet browser application, a video sharing site using application, and a calculator application.

For example, an information acquiring unit 421 acquires operation information transmitted from the in-car device 300. The operation information includes information representing an icon. The information acquiring unit 421 supplies the acquired operation information to the control unit 402. The control unit 402 executes a function corresponding to an icon included in the operation information.

For example, an information transmitting unit 422 transmits menu screen information which is an example of application information to the in-car device 300. The application information is not limited to the menu screen information. For example, display content of the display unit 406 of the mobile terminal 20 may be transmitted to the in-car device 300 and then displayed on the display unit 13 of the in-car device 300. In other words, display content displayed on the display unit 406 of the mobile terminal 20 is shared between the mobile terminal 20 and the in-car device 300.

The speaker 410 is an audio output device that outputs a sound, and outputs an audio signal that has been subjected to predetermined processing performed by the signal processing unit 404 as a sound. As a result, the user can listen to a voice call, audio data held in the mobile terminal 20, or the like. Further, the microphone 411 functions to input a sound for a call or a sound for an instruction input by a voice to the mobile terminal 20. The sound input through the microphone 411 is subjected to predetermined processing by the signal processing unit 404.

The mobile terminal 20 is configured as described above. Examples of the mobile terminal 20 include a mobile phone, a smart phone, a portable music player, and a tablet terminal. Further, although not shown, the mobile terminal 20 may have a camera function which is implemented by an imaging unit and an image processing unit, a radio function, or the like.

Figure 14:
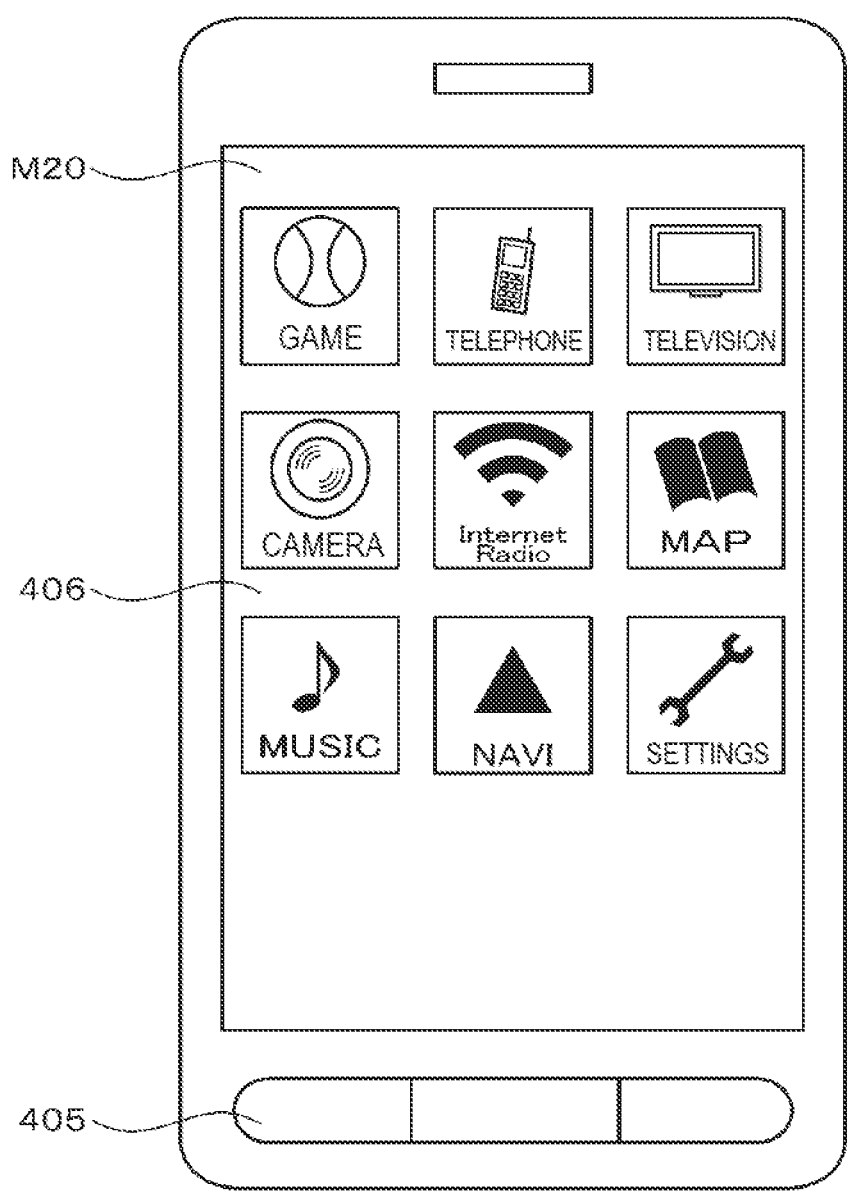
FIG. 14 illustrates an exemplary external appearance of a mobile terminal and an exemplary menu screen.

FIG. 14 illustrates an exemplary external appearance of the mobile terminal 20 and an exemplary menu screen. For example, the operating unit 405 and the display unit 406 are arranged in a housing of the mobile terminal 20. The display unit 406 displays a menu screen M20, and displays a plurality of icons corresponding to applications available in the mobile terminal 20. For example, an icon "game," an icon "telephone," an icon "television," an icon "camera," an icon "Internet," an icon "map," an icon "music," an icon "navigation," and an icon "settings" are displayed on the display unit 406.

As a tap operation is performed on a predetermined icon of the display unit 406, a function corresponding to the tapped icon is executed. The tap operation is an operation of touching the surface of the display unit once with a finger. In addition to the tap operation, operations such as a hold operation, a drag operation, and a flick operation can be performed on the mobile terminal 20. The hold operation is an operation of bringing a finger in contact with a predetermined portion of the surface of the display unit and maintaining contact with the finger during a predetermined period of time or more. The drag operation is an operation of moving a finger in an arbitrary direction while the finger is in contact with the surface of the display unit. The flick operation is an operation of bringing a finger in contact with a point of the surface of the display unit and rapidly moving the finger in an arbitrary direction like flicking.

"Information Sharing Between In-Car Device and Mobile Terminal"

Exemplary processing of sharing information between the in-car device 300 and the mobile terminal 20 will be described with reference to FIG. 15. First of all, in step S1, the in-car device 300 and the mobile terminal 20 are connected to each other. The connection is established by the two communication units using the Bluetooth connection method or the USB connection method as described above. When the connection is established by the Bluetooth connection method, transmission and reception of information between the in-car device 300 and the mobile terminal 20 are performed using a serial port profile. When the connection is established by the USB connection method, transmission and reception of information between the in-car device 300 and the mobile terminal 20 are performed using iAP. Then, the process proceeds to step S2.

In step S2, a connection completion notification is transmitted from the in-car device 300 to the mobile terminal 20. On the other hand, a connection completion notification may be transmitted from the mobile terminal 20 to the in-car device 300. Then, the process proceeds to step S3.

In step S3, a menu screen information acquisition request is transmitted from the in-car device 300 to the mobile terminal 20. Then, the process proceeds to step S4. In step S4, in response to the menu screen information acquisition request, menu screen information is transmitted from the mobile terminal 20 to the in-car device 300. Then, the process proceeds to step S5.

In step S5, the menu screen is displayed on the display unit 13 of the in-car device 300. For example, a display is performed such that a menu screen corresponding to the functions of the in-car device 300 and a menu screen corresponding to the functions of the mobile terminal 20 can be switched. Then, the process proceeds to step S6.

In step S6, an operation such as the slide operation is input using the input unit 110. Then, the process proceeds to step S7. In step S7, the press operation is performed to confirm selection of a predetermined icon. In response to the press operation, a predetermined function of the in-car device 300 is executed. When selection of an icon corresponding to the function of the mobile terminal 20 is confirmed, the process of step S8 is performed.

In step S8, operation information is transmitted from the in-car device 300 to the mobile terminal 20. For example, operation information includes information representing the icon on which selection is confirmed in step S7. Then, the process proceeds to step S9.

In step S9, the mobile terminal 20 performs an operation according to the operation information. In other words, the function of the icon included in the operation information is executed in the mobile terminal 20. As described above, it is possible to control the mobile terminal 20 through an operation on the input unit 110.

In addition, the process of steps S10 and S11 may be performed. For example, in step S9, the mobile terminal 20 is assumed to play back audio data. When the audio data is played back, information related to the audio data which is being played back is displayed on the display unit 406 of the mobile terminal 20. The display unit 406 displays, for example, an artist name, a jacket photograph, and an elapsed audio data playback time. Then, the process proceeds to step S10.

In step S10, display data corresponding to the display of the display unit 406 is transmitted from the mobile terminal 20 to the in-car device 300 in real time. The transmitted data is received by the in-car device 300. The received display data is supplied to the display control unit 208 according to control of the application processor 304. Then, the process proceeds to step S11.

In step S11, the display control unit 208 operates based on the supplied display data. As the display control unit 208 operates, the display unit 13 displays information related to the audio data which is being played back, and the display of the display unit 13 is updated. As described above, control may be performed such that content displayed on the display unit of the in-car device 300 is the same as or approximately the same as content displayed on the display unit of the mobile terminal 20.

Further, audio data may be transmitted from the mobile terminal 20 to the in-car device 300, and the transmitted audio data may be played back through the speaker 207 of the in-car device 300.

A process of supplying information between the in-car device 300 and the mobile terminal 20 (which is also referred to as a "pairing process") is not limited to the above-described process. A known process different from the above-described process may be applied.

Figure 15:
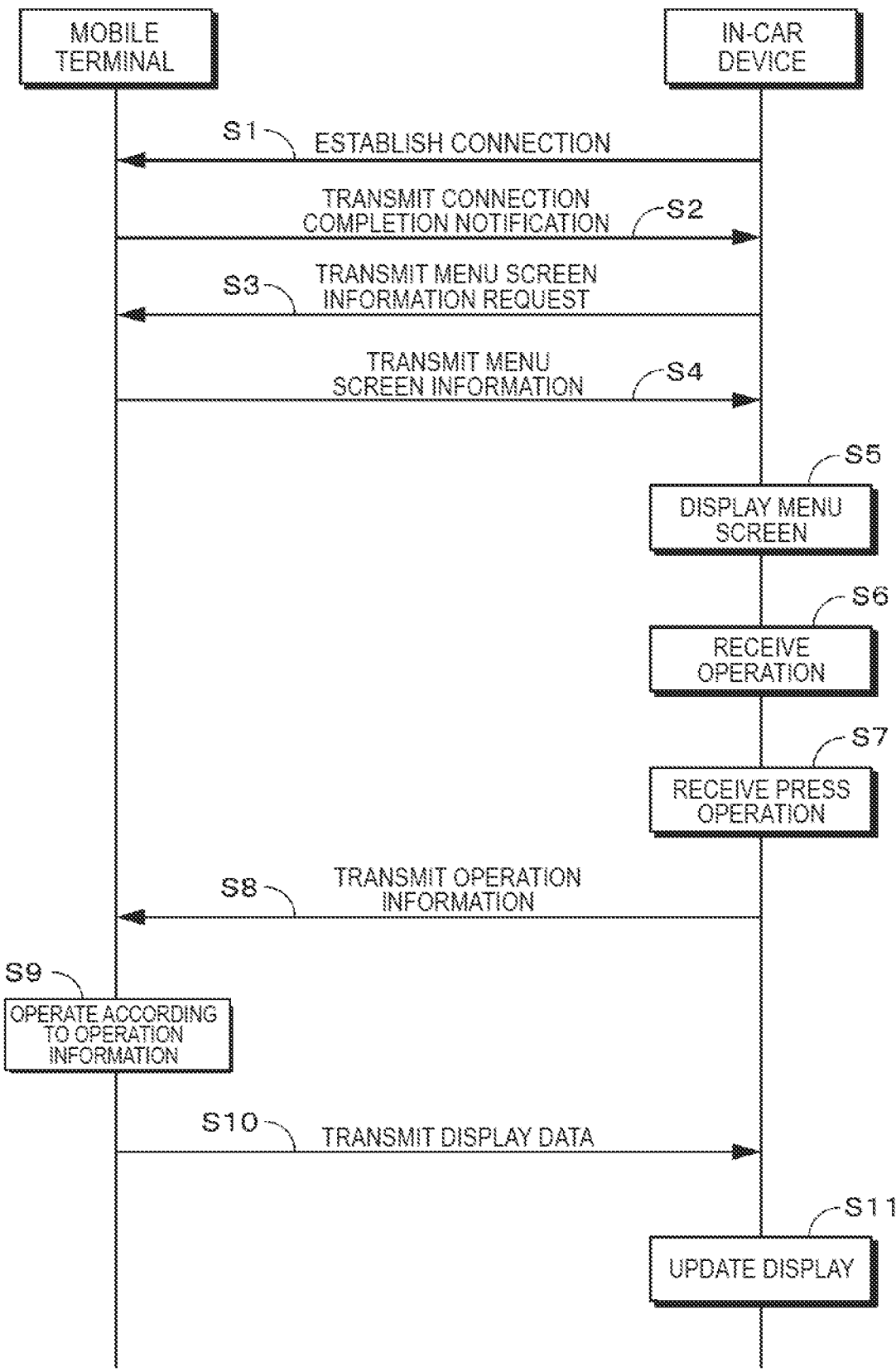
FIG. 15 is a flowchart for describing processing performed between an in-car device and a mobile terminal.
Figure 16:
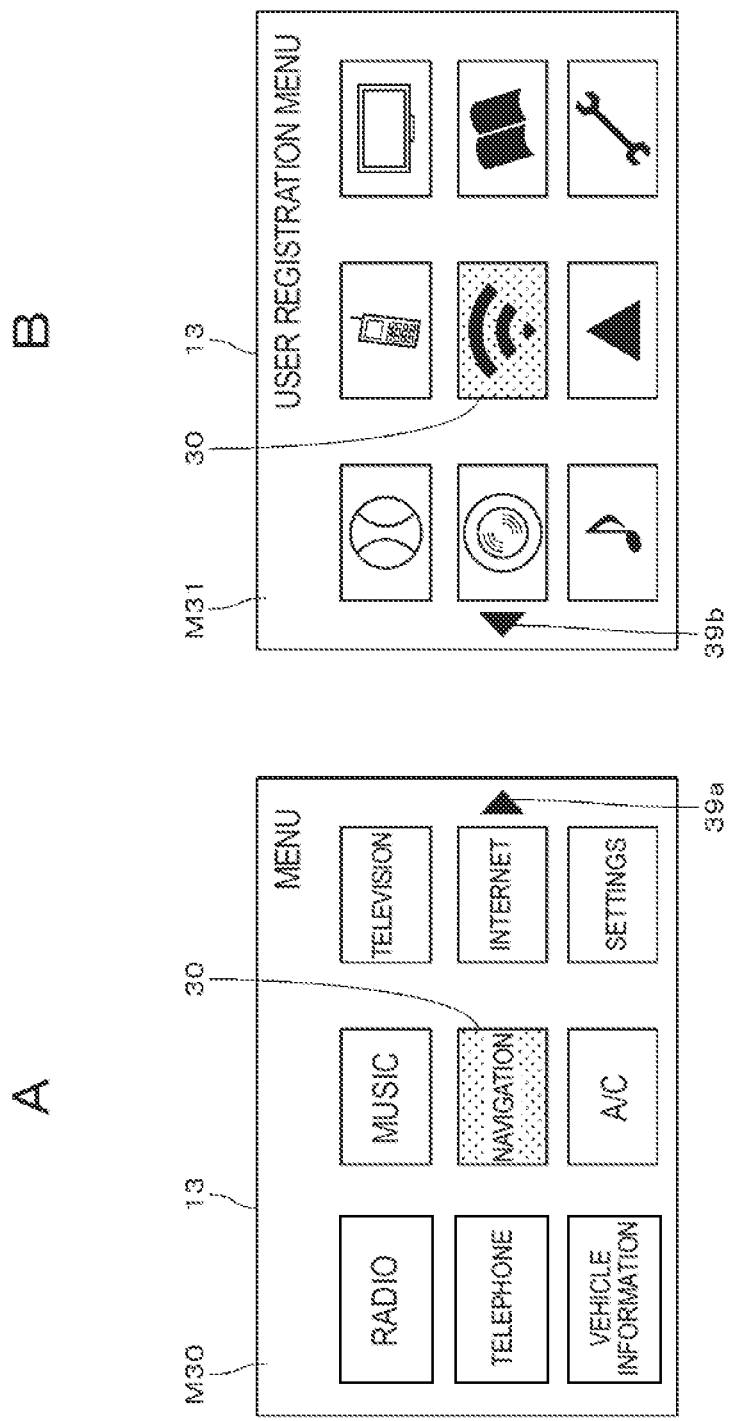
FIGS. 16A and 16B are diagrams for describing an example of menu screen switching.

FIG. 16 illustrates an exemplary display of the menu screen in step S5 of FIG. 15. As illustrated in FIG. 16A, the display unit 13 displays a menu screen M30 on which a plurality of icons corresponding to the functions of the vehicle are displayed. Switching from the menu screen M30 to a user registration menu screen M31 can be performed. As illustrated in FIG. 16B, the user registration menu screen M31 is a screen on which a plurality of icons corresponding to the functions of the mobile terminal 20 are displayed. For example, an icon arrangement in the menu screen M31 is the same as the icon arrangement in the menu screen M20 (see FIG. 14).

The cursor 30 is displayed on the menu screen M30, and a direction in which a display can transition is represented by a mark 39*a*. The cursor 30 is displayed on the menu screen M31, and a direction in which a display can transition is represented by a mark 39*b*.

When the driver performs the press and slide operation on the first input unit 110*a* in the right direction, the menu screen M30 can be switched to the user registration menu screen M31. On the other hand, when the driver performs the press and slide operation on the first input unit 110*a* in the left direction, the user registration menu screen M31 can be switched to the menu screen M30. Through the press and slide operation performed on the second input unit 110*b* in the upward or downward direction, the user registration menu screen M31 and the menu screen M30 may be switched in the upward or downward direction.

When the slide operation is performed in the state in which the user registration menu screen M31 is displayed on the display unit 13, the cursor 30 moves on the user registration menu screen M31, and a predetermined icon is selected. The selection of the icon can be confirmed by the press operation, and the function corresponding to the icon is executed in the mobile terminal 20. The operation and the process according to the operation are the same as the operation on the menu screen M10 according to the first embodiment, and thus a description will not be repeated.

Further, when a connection with the mobile terminal 20 is established in the in-car device 300, the display unit 13 preferably displays the user registration menu screen M31.

Generally, the mobile terminal 20 is used more frequently than the in-car device 300. For this reason, the icon arrangement in the menu screen M20 is stored by the user (the driver) to some extent. When the user registration menu screen M31 and the menu screen M20 have the same icon arrangement or approximately the same icon arrangement, the driver can determine a direction and the number of times in which the cursor moves to reach a desired icon without looking at the display unit 13. Here, since it is necessary for the driver for recognize the initial position of the cursor 30, for example, the initial position of the cursor 30 is preferably set to be at an icon at the center. The driver can execute a predetermined function of the mobile terminal 20 by appropriately operating the input unit 110 without looking at the display unit 13.

Further, an operation on the input unit 110 is an operation which is the same as or similar to an operation which can be made on the mobile terminal 20. For example, the slide operation on the input unit 110 is the same as or similar to the drag operation. The press operation is the same as or similar to the tap operation. The press and slide operation is the same as or similar to the flick operation. The press and hold operation is the same as or similar to the hold operation.

For example, when a lever device is arranged near a steering wheel and a blind operation is performed, the driver has to learn a direction in which a lever moves, a change in a display corresponding to the operation, and the like and thus has to perform an unfamiliar operation. However, since an operation on the input unit 110 is the same as or similar to an operation that can be made on the mobile terminal 20, it is unnecessary for the driver to learn a new operation method. In other words, it is possible to perform an operation during driving which is the same as or similar to an operation performed on the mobile terminal 20 on a routine basis.

3. Modified Examples

The exemplary embodiment of the present technology has been described above, but the present technology is not limited to the above embodiment, and various modifications can be made.

First Modified Example

Figure 17:
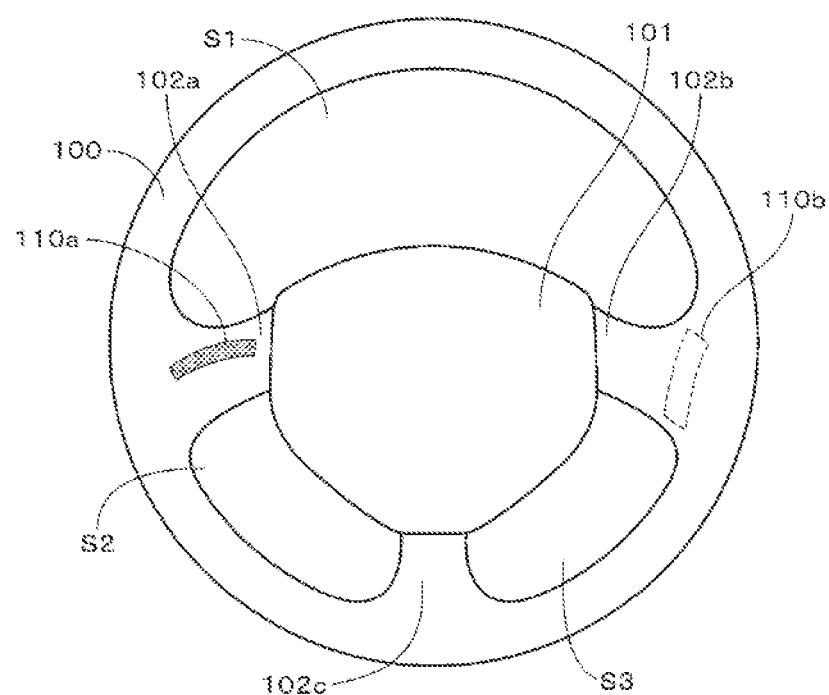
FIG. 17 is a diagram for describing a modified example.
Figure 18:
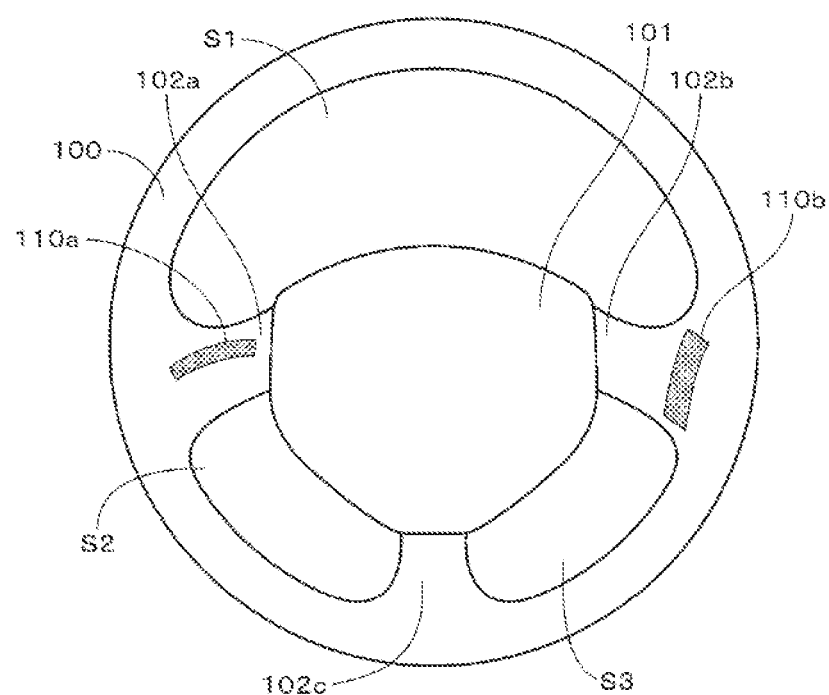
FIG. 18 is a diagram for describing a modified example.

The positions at which the first input unit 110*a* and the second input unit 110*b* are arranged can be appropriately changed. For example, as illustrated in FIG. 17, the first input unit 110*a* may be arranged on the surface of the spoke section 102*a*. Further, as illustrated in FIG. 18, the first input unit 110*a* and the second input unit 110*b* may be arranged on the same face of the steering pad. For example, the first input unit 110*a* may be arranged on the surface of the spoke section 102*a*, and the second input unit 110*b* may be arranged on the surface of the spoke section 102*b*. In addition, three or more input units 110 may be arranged, and an input unit that can receive an operation may be set. For example, among a plurality of input units, only an input unit corresponding to a dominant hand of the driver is set to be valid.

Second Modified Example

A device in which the input unit 110 is arranged is not limited to a steering pad. The input unit 110 may be arranged on the shift lever 15. FIG. 19A illustrates an example of the right side face 15*b* of the shift lever 15. A release button 17 is arranged on the right side face of the shift lever 15. The release button 17 is a button pressed near the tip of the thumb when the shift lever 15 is moved to the position of R (reverse), P (park), or the like. The first input unit 110*a* may be arranged below the release button 17. For example, the first input unit 110*a* has the shape of a curved band extending in the moving direction of the vehicle. The first input unit 110*a* is arranged at the position within a range within which the first input unit 110*a* can be operated by the thumb when the shift lever 15 is gripped.

FIG. 19B illustrates an example of the front face 15*d* of the shift lever 15. The second input unit 110*b* is arranged on the front face 15*d* of the shift lever 15. For example, the second input unit 110*b* has the shape of a band extending in the direction approximately orthogonal to the moving direction of the vehicle. The second input unit 110*b* may have a curved shape. The second input unit 110*b* is arranged at a position within a range within which the second input unit 110*b* can be operated by the index finger or the middle finger when the shift lever 15 is gripped. As described above, the input unit 110 is arranged in or near a device operated while the vehicle is driving. The device is not necessarily limited to the operated device, and the input unit 110 may be arranged in a device arranged around the driver seat (for example, on the surface of a door armrest formed in a door at the driver seat side).

Other Modified Example

The present technology may be configured as an input device that can receive some of a plurality of operations described in the above embodiment. The present technology may be configured as an input device that receives an operation different from the above-described operations.

Further, the input unit 110 may be configured with a capacitive type touch screen. In this case, in the slide operation or the press and slide operation, it is not necessary for the tip of the thumb F1 to be brought in contact with the input unit 110, and it is desirable to cause the tip of the thumb F1 to approach the operation face of the input unit 110. In other words, the meaning of the phrase "bringing a finger in contact with" may be interpreted as causing a finger to approach a position at which an operation can be detected.

The input unit 110 is not limited to a touch pad. For example, the input unit 110 may be configured with a rotatable dial. One of the first input unit 110*a* and the second input unit 110*b* may be configured with a touch pad having a curved band, and the other may be configured with a dial.

An icon corresponding to a function having a high use frequency may be arranged in a direction corresponding to a direction of an operation on the first input unit 110*a* and the second input unit 110*b*. For example, an icon corresponding to a function having the highest use frequency is displayed at the center of the menu screen. An icon corresponding to a function having a high use frequency may be displayed around the corresponding icon. As a result, the number of times an operation is performed on the first input unit 110*a* and the second input unit 110*b* can be reduced. In this case, the number of times the press operation is performed on an icon is stored as a log for each icon.

The user may be informed of a function of an icon at the position to which the cursor has moved by a sound. In this case, the user can recognize whether or not a selected icon is a desired icon without looking at the display unit 13. Further, it is possible to determine whether or not an operation on the input unit 110 is continued.

When the press and hold operation is performed on the input unit 110, an enlarging or reducing speed may be changed in proportion to the pressing force of the press and hold operation. A configuration in which the pressing force can be detected at multiple steps may be provided. When an operation (for example, the press and slide operation) other than the slide operation is performed, the informing operation may be performed. In the informing operation, the first pattern and the second pattern may have different vibration levels. When the slide operation is performed on the first input unit 110a and the second input unit 110b at approximately the same time, the cursor 30 may move in an oblique direction. An operation on the first input unit 110a and the second input unit 110b may be performed through an instrument attached to the tip of the finger. The input device of an embodiment of the present technology may be arranged in a device for controlling ships or air planes.

Further, the present technology is not limited to a device, and may be implemented as a method, a program for implementing the method, or a recording medium recording the program. In addition, the present technology may be implemented as a system including a configuration including an input unit and a configuration of performing a display according to an operation on the input unit.

The components and the processes in the embodiments and the modified examples can be appropriately combined within the scope in which there is no technical contradiction. An order of individual steps in the above-described process can be appropriately changed within the scope in which there is no technical contradiction.

The present technology can also be applied to a so-called cloud system in which the exemplified processes are performed by a plurality of devices in a distributed manner. The present disclosure can be realized as a system that executes the processes exemplified in the embodiments and the modified examples, which is a device that executes at least some of the exemplified processes.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An input device, including:
a steering pad that is arranged on a steering wheel of a vehicle and includes a first face and a second face opposite to the first face;
a first input unit that is arranged on the first face of the steering pad and receives an operation causing a first change of a display form in a display unit; and
a second input unit that is arranged on the second face of the steering pad and receives an operation causing a second change of a display form in the display unit.

(2) The input device according to (1), wherein
the first change of the display form is movement of a cursor displayed on the display unit in a first direction,
the second change of the display form is movement of the cursor in a second direction substantially orthogonal to the first direction,
the first input unit receives a first operation causing the first change,
the second input unit receives a second operation causing the second change,
the first operation is an operation of sliding the first input unit, and
the second operation is an operation of sliding the second input unit.

(3) The input device according to (2), wherein
at least one of the first input unit and the second input unit receives a third operation of executing a function corresponding to an item on which the cursor is displayed, and
the third operation is an operation of pressing at least one of the first input unit and the second input unit.

(4) The input device according to any one of (1) to (3), wherein
the first change of the display form is transition of a display in the display unit in a first direction,
the second change of the display form is transition of the display in a second direction substantially orthogonal to the first direction,
the first input unit receives a fourth operation causing the first change,
the second input unit receives a fifth operation causing the second change,
the fourth operation includes an operation of pressing the first input unit and a slide operation performed consecutively to the pressing operation, and
the fifth operation includes an operation of pressing the second input unit and a slide operation performed consecutively to the pressing operation.

(5) The input device according to any one of (1) to (4), wherein
the first change of the display form is enlargement of a display in the display unit,
the second change of the display form is reduction of the display,
the first input unit receives a sixth operation causing the first change,
the second input unit receives a seventh operation causing the second change,
the sixth operation is an operation of continuously pressing one of the first input unit and the second input unit for a predetermined period of time or more, and
the seventh operation is an operation of continuously pressing the other of the first input unit and the second input unit for a predetermined period of time or more.

(6) The input device according to any one of (1) to (5), wherein the first input unit vibrates according to the first operation, and the second input unit vibrates according to the second operation.

(7) The input device according to any one of (1) to (6), wherein, when it is possible to move the cursor according to one of the first operation and the second operation, the operated first input unit or the operated second input unit vibrates according to a first pattern, and when it is not possible to move the cursor, the operated first input unit or the operated second input unit vibrates according to a second pattern.

(8) The input device according to any one of (1) to (7), wherein at least one of the first input unit and the second input unit has a shape of a curved band.

(9) The input device according to any one of (1) to (8), wherein the first input unit and the second input unit are arranged at positions at which a projection image of the first input unit is substantially orthogonal to a projection image of the second input unit.

(10) The input device according to any one of (1) to (9), wherein the first face is a face substantially facing an operator who operates the first input unit and the second input unit.

(11) The input device according to any one of (1) to (10), further including
a wheel section that is formed integrally with the steering pad,
wherein the first input unit and the second input unit are arranged within a range in which the first input unit and the second input unit are operable by different fingers when a predetermined portion of the wheel section is gripped.

(12) The input device according to any one of (1) to (11), wherein the first input unit and the second input unit are touch pads or rotatable dials.

(13) The input device according to any one of (1) to (12), further including a communication unit that performs communication with a mobile terminal, wherein the display unit is a display unit disposed in the mobile terminal.

The present disclosure contains subject matter related to that disclosed in Japanese Priority Patent Application JP 2012-192570 filed in the Japan Patent Office on Aug. 31, 2012, the entire content of which is hereby incorporated by reference.

What is claimed is:

1. An input device, comprising:
    a steering pad on a steering wheel of a vehicle, wherein the steering pad includes a first face and a second face, wherein the second face is opposite to the first face;
    a first touch pad device on the first face of the steering pad, wherein
        the first touch pad device is configured to receive a first operation for a first change of a display appearance in a display unit,
        the display appearance includes a plurality of display elements arranged in a first arrangement, and
        the display appearance further includes a first indicator that indicates a first scrollable direction of the display appearance on the display unit; and
    a second touch pad device on the second face of the steering pad, wherein
        the first touch pad device is orthogonal to the second touch pad device,
        the second touch pad device is configured to receive a second operation for a second change of the display appearance in the display unit,
        the first change of the display appearance is movement of a cursor displayed on the display unit in a first direction,
        the second change of the display appearance is the movement of the cursor in a second direction orthogonal to the first direction,
        the first touch pad device is further configured to receive a third operation to update the display appearance,
        the updated display appearance includes a second indicator that indicates a second scrollable direction of the display appearance on the display unit, and
        at least one of the first touch pad device or the second touch pad device is configured to:
            vibrate in a first pattern based on the movement of the cursor according to corresponding one of the first operation or the second operation; and
            vibrate in a second pattern based on an inability to move the cursor,
        wherein a time duration of the vibration in the first pattern is different from a time duration of the vibration in the second pattern.

2. The input device according to claim 1, wherein
    the first operation is a first sliding operation that corresponds to slide of one of a user's thumb on the first touch pad device or a user's finger on the first touch pad device, and
    the second operation is a second sliding operation that corresponds to slide of one of the user's thumb on the second touch pad device or the user's finger on the second touch pad device.

3. The input device according to claim 1, wherein
    the third operation is a first pressing operation that corresponds to application of pressure by one of a user's thumb or a user's finger on at least one of the first touch pad device or the second touch pad device.

4. The input device according to claim 1, wherein
    the first change of the display appearance includes transition of a display in the display unit in the first direction,
    the second change of the display appearance includes transition of the display in the second direction orthogonal to the first direction,
    the first touch pad device is further configured to receive a fourth operation for the first change,
    the second touch pad device is further configured to receive a fifth operation for the second change,
    the fourth operation includes a first pressing operation that corresponds to application of pressure by one of a user's thumb or a user's finger on the first touch pad device and a first slide operation,
    the first slide operation corresponds to slide of one of the user's thumb or the user's finger on the first touch pad device, and the first slide operation is executed consecutively to the first pressing operation of the first touch pad device,
    the fifth operation includes a second pressing operation that corresponds to application of pressure by one of the user's thumb or the user's finger on the second touch pad device and a second slide operation,
    the second slide operation corresponds to slide of one of the user's thumb or the user's finger on the second touch pad device, and the second slide operation is executed consecutively to the second pressing operation of the second touch pad device.

5. The input device according to claim 1, wherein
    the first change of the display appearance includes enlargement of a display in the display unit,
    the second change of the display appearance includes reduction of the display,
    the first touch pad device is further configured to receive a fourth operation for the first change,
    the second touch pad device is further configured to receive a fifth operation for the second change,
    the fourth operation is a first pressing operation that corresponds to application of pressure by one of a user's thumb or a user's finger on the first touch pad device for a period of time, and
    the fifth operation is a second pressing operation that corresponds to application of pressure by one of the user's thumb or the user's finger on the second touch pad device for the period of time.

6. The input device according to claim 1, wherein
    the time duration of the vibration in the first pattern is greater than the time duration of the vibration in the second pattern.

7. The input device according to claim 1, wherein at least one of the first touch pad device or the second touch pad device is a curved band.

8. The input device according to claim 1, wherein the first touch pad device and the second touch pad device are at positions at which a first projection image of the first touch pad device is orthogonal to a second projection image of the second touch pad device.

9. The input device according to claim 1, wherein the first face faces a user who operates the first touch pad device and the second touch pad device.

10. The input device according to claim 1, further comprising
a wheel section integrated with the steering pad,
wherein the first touch pad device and the second touch pad device are within a distance range on the steering pad such that the first touch pad device and the second touch pad device are concurrently operable by a user in case a portion of the wheel section is gripped.

11. The input device according to claim 1, further comprising a transceiver configured to communicate with a mobile terminal, wherein the display unit is included in the mobile terminal.

12. The input device according to claim 1, wherein
at least one of the first touch pad device or the second touch pad device is integrated with a vibrating unit,
the vibrating unit is configured to vibrate based on an applied voltage of a wave pattern, and
the vibrating unit is further configured to vibrate a number of times corresponding to a number of times the cursor moves on the display unit.

13. The input device according to claim 1, further comprising one or more processors configured to:
determine a plurality of corresponding numbers that indicate a plurality of times an operation is executed on the plurality of display elements, based on information stored in a memory, wherein the stored information corresponds to the execution of the operation on each of the plurality of display elements; and
change the first arrangement of the plurality of display elements to a second arrangement of the plurality of display elements on the display unit based on the plurality of corresponding numbers.

* * * * *